United States Patent
Pang et al.

(10) Patent No.: US 9,491,780 B2
(45) Date of Patent: Nov. 8, 2016

(54) METHOD AND DEVICE FOR PROCESSING RANDOM ACCESS PARAMETER

(71) Applicant: Huawei Technologies Co., LTD., Shenzhen (CN)

(72) Inventors: Lingli Pang, Shenzhen (CN); Li Feng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 153 days.

(21) Appl. No.: 14/268,607

(22) Filed: May 2, 2014

(65) Prior Publication Data
US 2014/0241285 A1 Aug. 28, 2014

Related U.S. Application Data

(63) Continuation of application No. PCT/CN2012/084013, filed on Nov. 2, 2012.

(30) Foreign Application Priority Data

Nov. 2, 2011 (CN) .......................... 2011 1 0341718
Jul. 24, 2012 (CN) .......................... 2012 1 0257740

(51) Int. Cl.
*H04W 74/08* (2009.01)

(52) U.S. Cl.
CPC .............................. *H04W 74/0833* (2013.01)

(58) Field of Classification Search
CPC ......... H04W 74/0833; H04W 74/002; H04W 74/004; H04W 74/008; H04W 74/0866; H04W 24/10; H04W 28/18
See application file for complete search history.

(56) References Cited

U.S. PATENT DOCUMENTS

| 6,963,540 B2* | 11/2005 | Choi | H04B 7/264 370/252 |
| 7,957,298 B2* | 6/2011 | Yi | H04W 74/002 370/242 |
| 7,986,946 B2* | 7/2011 | Pettersson | H04W 24/00 370/241 |

(Continued)

FOREIGN PATENT DOCUMENTS

| CN | 101969662 A | 2/2011 |
| CN | 101990236 A | 3/2011 |

(Continued)

OTHER PUBLICATIONS

Lte, "3$^{rd}$ Generation Partnership Project; Technical Specification Group Radio Access Network; Radio Resource Control (RRC); Protocol specification" (Release 10) 3GPP TS 25.331, V10.5.0, Sep. 2011, 1882 pages.

*Primary Examiner* — Andrew Lai
*Assistant Examiner* — Chuong M Nguyen
(74) *Attorney, Agent, or Firm* — Brinks Gilson & Lione

(57) ABSTRACT

A method and a device for processing a random access parameter, so as to properly adjust the random access parameter and improve a success rate of random access includes receiving a random access report of a first cell reported by one or more user terminals, where a random access detection item recorded in the random access report includes: at least one of number of times of preamble cycles in each random access, a reason for preamble transmission failure within each preamble cycle period and a random access delay; performing random access detection item statistics according to the random access report and obtaining a statistical value, if the statistical value reaches a preset threshold, adjusting the random access parameter of the first cell; and issuing the adjusted random access parameter to a user terminal belonging to the first cell.

30 Claims, 7 Drawing Sheets

(56) References Cited

U.S. PATENT DOCUMENTS

| | | | |
|---|---|---|---|
| 8,526,986 B2* | 9/2013 | Fischer | H04W 74/004 370/470 |
| 9,072,076 B2* | 6/2015 | Hagerman | H04W 74/008 |
| 2009/0109937 A1* | 4/2009 | Cave | H04W 74/0866 370/336 |
| 2010/0232318 A1* | 9/2010 | Sarkar | H04W 28/18 370/254 |
| 2010/0323710 A1* | 12/2010 | Chen | H04W 74/004 455/450 |
| 2011/0165874 A1 | 7/2011 | Amirijoo et al. | |
| 2012/0008524 A1* | 1/2012 | Amirijoo | H04W 24/10 370/252 |
| 2014/0135018 A1* | 5/2014 | Hedberg | H04W 48/20 455/437 |

FOREIGN PATENT DOCUMENTS

| | | |
|---|---|---|
| WO | WO 2010/002303 A1 | 1/2010 |
| WO | WO 2010/124453 A1 | 11/2010 |

* cited by examiner

METHOD AND DEVICE FOR PROCESSING RANDOM ACCESS PARAMETER

CROSS-REFERENCE TO RELATED APPLICATIONS

This application is a continuation of International Application No. PCT/CN2012/084013, filed on Nov. 2, 2012, which claims priority to Chinese Patent Application No. 201110341718.3, filed on Nov. 2, 2011 and Chinese Patent Application No. 201210257740.4, filed on Jul. 24, 2012, all of which are hereby incorporated by reference in their entireties.

TECHNICAL FIELD

The present application relates to the field of communications and, more particularly, to a method and a device for processing a random access parameter.

BACKGROUND

A random access process needs to be initiated when a user terminal switches from an idle state to a connected state, or when the user terminal transmits uplink information in different states, such as a cell forward access state, a cell paging state or a registration zone paging state.

The user terminal transmits a preamble with an initial transmission power, particularly, the initial transmission power=a pilot transmission power−a received signal code power on a common pilot channel+an uplink interference+a constant factor of physical random access channel demodulation. Particularly, the pilot transmission power, uplink interference, and the constant factor of physical random access channel demodulation are issued by a network device through a system message, the network device may be a radio network controller (RNC) or an evolved base station (eNodeB). However the received signal code power on the common pilot channel is obtained by the user terminal by measuring the common pilot channel.

If the user terminal receives positive acknowledgment information on an acquisition indicator channel (AICH), the user terminal deems that the random access is successful and starts to transmit uplink data. If the user terminal fails to receive acknowledgment information (positive/negative) on the AICH, then the user terminal ramps up its power in a specified power step and retransmits the preamble until a maximum retransmission count is reached, or the transmission power reaches a maximum value or acknowledgment information is received on the AICH; if the power of the user terminal is ramped up to the maximum power value or number of times of retransmission reaches the maximum count or the negative acknowledgment information is received on the AICH, then a lower layer of the user terminal reports an indication to a higher layer of the user terminal, and the higher layer of the user terminal re-indicates the lower layer to initiate the random access process after waiting for a period of time, except that the preamble cycle reaches the maximum times. If the preamble cycle reaches the maximum times, but the user terminal has not yet been successfully accessed, the user terminal deems that random access is failed.

In terms of a user terminal supporting a common enhanced dedicated channel, after positive acknowledgment information is received on the AICH, further, if its own radio network temporary identity is received on an enhanced dedicated channel absolute grant channel during a collision monitoring period, the user terminal deems that a resource collision does not occur, otherwise, the collision occurs.

In the random access process, a parameter for guiding the random access is a random access parameter. The random access parameter is issued by the network device to the user terminal through the system message, and improper configuration of the random access parameter will reduce the random access success rate, increase the access delay and affect user experience. Therefore, optimizing the random access parameter is very important.

Currently, the method for optimizing the random access parameter is guiding the random access parameter optimization according to the random access report reported by the user terminal, for example, in a long term evolution (LTE) system shown in FIG. 1, the user terminal records a random access report each time when the user terminal initiates a random access process, the network device requests the user terminal to report the random access report at an appropriate moment, and the specific procedure is as follows:

S101: The user terminal records a random access report each time when the user terminal initiates a random access, where the random access parameters recorded in contents of the random access report includes number of times of preamble transmissions within each preamble cycle period and a collision indicator.

S102: The evolved base station transmits a request message to the user terminal, and requests the user terminal to report the random access report by using a random access report request indicator.

S103: The user terminal reports the random access report through a response message, after receiving the request message including the random access report request indicator.

S104: The evolved base station determines whether the random access parameter configuration is proper by counting the random access report reported by multiple user terminals and, if not proper, adjusts the random access parameter, and issues the adjusted random access parameter to the user terminal.

In the prior art, the random access parameters recorded in contents of the random access report only includes two entries of information, that is, number of times of preamble transmissions within each preamble cycle period and the collision indicator. Since the existing method for optimizing the random access parameter counts little random access information, when applied to a universal mobile telecommunication system, especially a universal mobile telecommunication (UMTS) system, it is difficult to evaluate whether the random access parameter configuration is proper with little random access information.

SUMMARY

Various aspects of the present application provide a method and a device for processing a random access parameter, so as to perform statistics to random access performance according to the random access report reported by one or more terminals, so that the random access parameter can be adjusted more properly, and a success rate of random access can be improved.

One aspect of the present invention provides a method for processing a random access parameter, including: receiving a random access report of a first cell reported by one or more user terminals, where a random access detection item recorded in the random access report includes at least one of number of times of preamble cycles in each random access, a reason for preamble transmission failure within each preamble cycle period and a random access delay; performing random access detection item statistics according to the random access report and obtaining a statistical value, if the statistical value reaches a preset threshold, then adjusting the random access parameter of the first cell; and issuing the adjusted random access parameter to a user terminal belonging to the first cell.

Optionally, the random access detection item recorded in the random access report further includes at least one of number of times of random access, an identifier of a random access cell, an identifier of a PLMN to which a random access cell belongs, information of time when a random access occurs, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms transmission time interval TTI length, or an enhanced random access corresponding to 10 ms TTI length.

Optionally, the redirection indicator is used for indicating that the random access is initiated when the user terminal is redirected to the first cell.

Optionally, the preset threshold includes at least one of a random access success probability threshold, a proportional threshold for number of times of preamble cycles, a proportional threshold for number of times of preamble retransmission, a proportional threshold for a preamble transmission power, a proportional threshold for negative acknowledgment information, and a random access delay threshold.

Optionally, when a ratio of the number of times of random access success in the random access report reported by one or more user terminals to total number of times of random access is less than the random access success probability threshold, the adjusting the random access parameter of the first cell further includes: increasing random access resources of the first cell.

Optionally, when a ratio that the number of times of preamble cycles in each random access reaches a maximum value in the random access report reported by one or more user terminals reaches the proportional threshold for the number of times of preamble cycles, the adjusting the random access parameter of the first cell further includes: increasing the maximum number of times of preamble cycles in the random access of the first cell.

Optionally, when a reason for preamble transmission failure within each preamble cycle period in the random access report reported by one or more user terminals is that a ratio of reaching the maximum number of times of retransmission is greater than the proportional threshold for the number of times of preamble retransmission, the adjusting the random access parameter of the first cell further includes: increasing a transmission power of a primary common pilot channel of the first cell, and/or increasing uplink interference, and/or increasing a constant factor of random access channel demodulation, and/or increasing a power ramp step, and/or increasing a parameter of the maximum number of times of preamble retransmission.

Optionally, when the reason for preamble transmission failure within each preamble cycle period in the random access report reported by one or more user terminals is that a ratio that the preamble transmission power reaches a maximum value is greater than the proportional threshold for the preamble transmission power, the adjusting the random access parameter of the first cell further includes: reducing a transmission power of a primary common pilot channel of the first cell, and/or reducing uplink interference, and/or reducing a constant factor of random access channel demodulation, and/or reducing a power ramp step.

Optionally, when the reason for preamble transmission failure within each preamble cycle period in the random access report reported by one or more user terminals is that a ratio of receiving the negative acknowledgment information on the acquisition indicator channel is greater than the proportional threshold for negative acknowledgment information, the adjusting the random access parameter of the first cell further includes: increasing random access resources of the first cell.

Optionally, when the random access delay in the random access report reported by one or more user terminals is greater than the random access delay threshold, the adjusting the random access parameter of the first cell further includes: increasing random access resources of the first cell.

Optionally, before receiving the random access report of the first cell reported by one or more user terminals, the method further includes: receiving capability information recording whether one or more user terminals support random access parameter optimization, reported by one or more user terminals; detecting, according to the capability information, whether one or more user terminals support the random access parameter optimization; and issuing indication information for indicating one or more user terminals to record the random access report, if one or more user terminals support the random access parameter optimization.

Optionally, after receiving the random access report of the first cell reported by one or more user terminals, the method further includes: if the random access report received by a network device to which the first cell belongs includes access information of a second cell, forwarding the access information of the second cell to a network device to which the second cell belongs, where the network device to which the first cell belongs is different from the network device to which the second cell belongs.

Another aspect provides a method for processing a random access parameter, including: recording a random access report, where the random access detection item recorded in the random access report includes at least one of number of times of preamble cycles in each random access, a reason for preamble transmission failure within each preamble cycle period and a random access delay; reporting the random access report to the network device; receiving and storing the random access parameter adjusted by the network device.

Optionally, the random access detection item recorded in the random access report further includes at least one of number of times of random access, an identifier of a random access cell, an identifier of a PLMN to which a random access cell belongs, information of time when a random access occurs, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms transmission time interval TTI length, or an enhanced random access corresponding to 10 ms TTI length.

Optionally, the redirection indicator is used for indicating that the random access is initiated when the user terminal is redirected to the first cell.

Optionally, the method further includes: reporting capability information recording whether one or more user terminals support random access parameter optimization to the network device; and receiving indication information for indicating the user terminal to record the random access report, where the indication information is issued by the network device after judging the capability information and acknowledging that the random access parameter optimization is supported.

Optionally, before reporting the random access report to the network device, the method further includes: reporting available information of the random access report to the network device, where the available information of the random access report is used for reporting to the network device that the user terminal records the random access report.

Optionally, before reporting the random access report to the network device, the method further includes: receiving request information issued by the network device, where the request information is used for requesting the user terminal to report the random access report to the network device.

Optionally, when the random access report records information of successful random access, the random access report records the identifier of the random access cell.

Optionally, when the random access report records information of failed random access, the random access report records at least one of number of times of random access, an identifier of a random access cell, an identifier of a public land mobile network (PLMN) to which the random access cell belongs, information of time when a random access occurs, number of times of preamble cycles in each random access, a reason for preamble transmission failure within each preamble cycle period, a random access type, a radio signal quality of a common pilot channel and a random access delay.

Optionally, when the random access report records random access success information, the random access report further records the PLMN identifier and/or the random access type, after recording the identifier of the random access cell.

Optionally, when the number of times of transmitting a preamble or the number of times of preamble cycles in the random access reaches a first preset threshold, the random access report records at least one of number of times of a random access, an identifier of a random access cell, an identifier of a public land mobile network (PLMN) to which the random access cell belongs, information of time when a random access occurs, number of times of preamble cycles in each random access, a reason for preamble transmission failure within each preamble cycle period, a random access type, a radio signal quality of a common pilot channel and a random access delay.

Optionally, when the number of times of transmitting the preamble or the number of times of preamble cycles in the random access fails to reach the first preset threshold, the random access report records the identifier of the random access cell.

Optionally, when the number of times of transmitting the preamble or the number of times of preamble cycles in the random access fails to reach the first preset threshold, the random access report further records the PLMN identifier and/or the random access type, after recording the identifier of the random access cell.

Optionally, when one of a value of number of times of random access failure (m)/total number of times of access (n), an average access delay, an average number of times of preamble transmission, and number of times of preamble cycle ramp is greater than or equal to a second preset threshold, storing the random access report.

Optionally, when one of a value of m/n, an average access delay, an average number of times of preamble transmission, and number of times of preamble cycle ramp is less than the second preset threshold, deleting the random access report.

Optionally, the reporting the random access report to the network device further includes: when one of a value of m/n, an average access delay, an average number of times of preamble transmission, and number of times of preamble cycle ramp is greater than or equal to the second preset threshold, spontaneously reporting, by a user terminal, the random access report.

Another aspect provides a network device, including: a first receiving unit, configured to receive a random access report reported by one or more user terminals, where the report includes the random access report of the first cell, reported by one or more user terminals, and the random access detection item recorded in the random access report includes at least one of number of times of preamble cycles in each random access, a reason for preamble transmission failure within each preamble cycle period and a random access delay; an adjusting unit, configured to perform random access detection item statistics according to the random access report and obtain a statistical value, if the statistical value reaches a preset threshold, adjust the random access parameter of the first cell; and an issuing unit, configured to issue the adjusted random access parameter to a user terminal belonging to the first cell.

Optionally, the random access detection item recorded in the random access report further includes at least one of number of times of random access, an identifier of a random access cell, an identifier of a PLMN to which the random access cell belongs, information of time when a random access occurs, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms transmission time interval TTI length, or an enhanced random access corresponding to 10 ms TTI length.

Optionally, the redirection indicator is used for indicating that the random access is initiated when the user terminal is redirected to the first cell.

Optionally, the preset threshold includes at least one of a random access success probability threshold, a proportional threshold for number of times of preamble cycles, a proportional threshold for number of times of preamble retransmission, a proportional threshold for a preamble transmission power, a proportional threshold for negative acknowledgment information, and a random access delay threshold; the adjusting unit further includes: a first adjusting subunit, a second adjusting subunit, a third adjusting subunit, a fourth adjusting subunit and/or a fifth adjusting subunit.

Optionally, the first adjusting subunit is configured to increase random access resources of the first cell, when a ratio of the number of times of random access success in the random access report of the first cell, reported by one or more user terminals to total number of times of random access is less than the random access success probability threshold.

Optionally, the second adjusting subunit is configured to increase a maximum number of times of cycles in the random access corresponding to the first cell, when a ratio that the number of times of preamble cycles in each random access reaches a maximum value in the random access report of the first cell, reported by one or more user terminals reaches the proportional threshold for number of times of preamble cycles.

Optionally, the third adjusting subunit is configured to increase a transmission power of a primary common pilot channel corresponding to the first cell, and/or increase uplink interference, and/or increase a constant factor of random access channel demodulation, and/or increase a power ramp step, and/or increase a parameter of a maximum number of times of preamble retransmission, when a reason for preamble transmission failure within each preamble cycle period in the random access report of the first cell, reported by one or more user terminals is that a ratio of reaching the maximum number of times of retransmission is greater than the proportional threshold for the number of times of preamble retransmission.

Optionally, the fourth adjusting subunit is configured to reduce a transmission power of a primary common pilot channel, and/or reduce uplink interference, and/or reduce a constant factor of random access channel demodulation, and/or reduce a power ramp step, when the reason for preamble transmission failure within each preamble cycle period in the random access report of the first cell, reported by one or more user terminals is that a ratio that the preamble transmission power reaches a maximum value is greater than the proportional threshold for the preamble transmission power.

Optionally, the fifth adjusting subunit is configured to increase random access resources, when the reason for preamble transmission failure within each preamble cycle period in the random access report of the first cell, reported by one or more user terminals is that a ratio of receiving the negative acknowledgment information on the acquisition indicator channel is greater than the proportional threshold for negative acknowledgment information.

Optionally, the sixth adjusting subunit is configured to increase random access resources of the first cell, when the random access delay in the random access report reported by one or more user terminals is greater than the random access delay threshold.

Optionally, the device further includes: a detecting unit, configured to detect whether one or more user terminals support the random access parameter optimization, according to the capability information recording whether one or more user terminals support random access parameter optimization, reported by one or more user terminals; and a forwarding unit, configured to forward the access information of the second cell to a network device to which the second cell belongs, if the random access report received by a network device to which the first cell belongs includes access information of a second cell, where the network device to which the first cell belongs is different from the network device to which the second cell belongs.

Optionally, the first receiving unit is further configured to receive capability information recording whether one or more user terminals support random access parameter optimization, reported by one or more user terminals; the issuing unit is further configured to issue indication information for indicating one or more user terminals to record the random access report, if one or more user terminals support the random access parameter optimization; and/or issue request information, for requesting one or more user terminals to report the random access report.

Another aspect provides a user terminal, including: a recording unit, configured to record a random access report, where the random access detection item recorded in the random access report includes at least one of number of times of preamble cycles in each random access, a reason for preamble transmission failure within each preamble cycle period and a random access delay; a reporting unit, configured to report the random access report to the network device; a second receiving unit, configured to receive the random access parameter adjusted by the network device; and a storage unit, configured to store the random access parameter adjusted by the network device.

Optionally, the random access detection items recorded in the random access report further include at least one of number of times of random access, an identifier of a random access cell, an identifier of a PLMN to which a random access cell belongs, information of time when a random access occurs, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms transmission time interval TTI length, or an enhanced random access corresponding to 10 ms TTI length.

Optionally, the redirection indicator is used for indicating that the random access is initiated when the user terminal is redirected to the first cell.

Optionally, the reporting unit is further configured to report capability information recording whether the user terminal supports random access parameter optimization to the network device; the second receiving unit is further configured to receive indication information for indicating to record the random access report, where the indication information is issued by the network device after judging the capability information and acknowledging that the random access parameter optimization is supported; and/or receive request information, for requesting to report the random access report to the network device, issued by the network device.

Another aspect provides a network device, including: a receiver, configured to receive a random access report reported by one or more user terminals, where the report includes the random access report of the first cell, reported by one or more user terminals, and the random access detection item recorded in the random access report includes at least one of number of times of preamble cycles in each random access, a reason for preamble transmission failure within each preamble cycle period and a random access delay; a processor, configured to perform random access detection item statistics according to the random access report and obtain a statistical value, if the statistical value reaches a preset threshold, adjust the random access parameter of the first cell; and a transmitter, configured to issue the adjusted random access parameter to a user terminal belonging to the first cell.

Optionally, the random access detection item recorded in the random access report further includes at least one of an identifier of a random access cell, an identifier of a PLMN to which a random access cell belongs, information of time when a random access occurs, number of times of a random access, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms transmission time interval TTI length, or an enhanced random access corresponding to 10 ms TTI length.

Optionally, the redirection indicator is used for indicating that the random access is initiated when the user terminal is redirected to the first cell.

Optionally, the preset threshold includes at least one of a random access success probability threshold, a proportional threshold for number of times of preamble cycles, a proportional threshold for number of times of preamble retransmission, a proportional threshold for a preamble transmission power, and a proportional threshold for negative acknowledgment information, and the processor is further configured to:

increase random access resources of the first cell, when a ratio of the number of times of random access success in the random access report of the first cell, reported by one or more user terminals to total number of times of random access is less than the random access success probability threshold; and/or increase a maximum number of times of cycles in the random access of the first cell, when a ratio that the number of times of preamble cycles in each random access reaches maximum value in the random access report of the first cell, reported by one or more user terminals reaches the proportional threshold for the number of times of preamble cycles; and/or increase a transmission power of a primary common pilot channel of the first cell, and/or increase uplink interference, and/or increase a constant factor of random access channel demodulation, and/or increase a power ramp step, and/or increase a parameter of a maximum number of times of preamble retransmission, when a reason for preamble transmission failure within each preamble cycle period in the random access report of the first cell, reported by one or more user terminals is that a ratio of reaching the maximum number of times of retransmission is greater than the proportional threshold for the number of times of preamble retransmission; and/or reduce a transmission power of a primary common pilot channel of the first cell, and/or reduce uplink interference, and/or reduce a constant factor of random access channel demodulation, and/or reduce a power ramp step, when the reason for preamble transmission failure within each preamble cycle period in the random access report of the first cell, reported by one or more user terminals is that a ratio that the preamble transmission power reaches a maximum value is greater than the proportional threshold for the preamble transmission power; and/or increase random access resources of the first cell, when the reason for preamble transmission failure within each preamble cycle period in the random access report of the first cell, reported by one or more user terminals is that a ratio of receiving the negative acknowledgment information on the acquisition indicator channel is greater than the proportional threshold for negative acknowledgment information; and/or increase random access resources of the first cell, when the random access delay in the random access report reported by one or more user terminals is greater than the random access delay threshold.

Optionally, the network device further includes: a detector, configured to detect whether one or more user terminals support the random access parameter optimization, according to the capability information recording whether one or more user terminals support random access parameter optimization, reported by one or more user terminals; where the transmitter is further configured to forward the access information of the second cell to a network device to which the second cell belongs, if the random access report received by a network device to which the first cell belongs includes access information of a second cell, where the network device to which the first cell belongs is different from the network device to which the second cell belongs.

Optionally, the receiver is further configured to receive capability information recording whether one or more user terminals support random access parameter optimization, reported by one or more user terminals; the transmitter is further configured to issue indication information for indicating one or more user terminals to record the random access report, if one or more user terminals support the random access parameter optimization; and/or issue request information, for requesting one or more user terminals to report the random access report.

Another aspect provides a user terminal, including: a processor, configured to record a random access report and store the random access parameter adjusted by the network device, where a random access detection item recorded in the random access report includes at least one of number of times of preamble cycles in each random access, a reason for preamble transmission failure within each preamble cycle period and a random access delay; a transmitter, configured to report the random access report to the network device; and a receiver, configured to receive the random access parameter adjusted by the network device.

Optionally, the random access detection item recorded in the random access report further includes at least one of an identifier of a random access cell, an identifier of a PLMN to which a random access cell belongs, information of time when a random access occurs, number of times of a random access, a random access type, a radio signal quality of a common pilot channel, a collision indicator, a system message failure indicator, and a redirection indicator.

Optionally, the random access type includes a random access, or an enhanced random access, or an enhanced random access corresponding to 2 ms TTI length, or an enhanced random access corresponding to 10 ms TTI length.

Optionally, the redirection indicator is used for indicating that the random access is initiated when the user terminal is redirected to the first cell.

Optionally, the transmitter is further configured to report capability information recording whether the user terminal supports random access parameter optimization to the network device; the receiver is further configured to receive indication information for indicating to record the random access report, where the indication information is issued by the network device after judging the capability information and acknowledging that the random access parameter optimization is supported; and/or receive request information, for requesting to report the random access report to the network device, issued by the network device.

Compared with the prior art, the method and the device for processing the random access parameter as described above can improve the success rate of random access.

BRIEF DESCRIPTION OF DRAWINGS

In order to illustrate the technical solutions in embodiments clearly, accompanying drawings needed in the embodiments are illustrated briefly as follows. Apparently, the accompanying drawings are merely certain of embodiments, and persons skilled in the art can derive other drawings from them without creative efforts.

DESCRIPTION OF EMBODIMENTS

Figure 1:
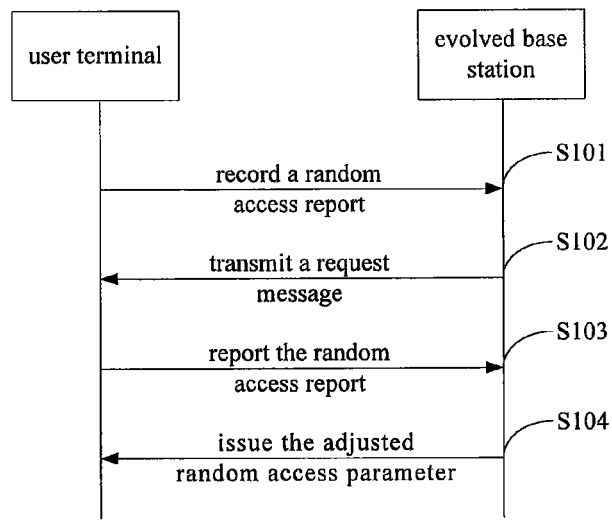
FIG. 1 is a schematic flow chart of a random access process in the prior art.

The technical solutions in the embodiments are hereinafter described clearly and completely with reference to the accompanying drawings in the embodiments. Obviously, the embodiments described here are part of the embodiments and not all of the embodiments. All other embodiments, which can be derived by persons skilled in the art from the embodiments given herein without creative efforts, shall fall within the protection scope of the claims.

In the following description, for purposes of explanation and not limitation, specific details are set forth, such as a particular system structure, an interface and techniques in order to provide a thorough understanding of the scope of the claims. However, it will be clear to persons skilled in the art that other embodiments may also be practiced without these specific details.

The techniques described herein can be used for various wireless communication systems such as the current 2G and 3G communication systems and the next generation communication system, such as a global system for mobile communication (GSM) system, a code division multiple access (CDMA) system, a time division multiple access (TDMA) system, a wideband code division multiple access (WCDMA) system, a frequency division multiple addressing (FDMA) system, an orthogonal frequency-division multiple access (OFDMA) system, a single carrier FDMA (SC-FDMA) system, a general packet radio service (GPRS) system, a long term evolution (LTE) system, and other communication systems of this kind.

Various aspects are described herein in connection with a terminal and/or a base station and/or a base station controller.

The user equipment may be a wired terminal or a wireless terminal, the wireless terminal may refer to a device providing voice and/or data connectivity to a user, a handheld device having wireless connection function, or other processing device connected to a wireless modem. The wireless terminal can communicate with one or more core networks via a wireless access network (such as, radio access network (RAN)), the wireless terminal may be a mobile terminal, such as a mobile phone (or a "cellular" phone) and a computer with a mobile terminal, and thus can be, for example, portable, pocket, hand-held, computer-included, or car-mounted mobile devices which communicate voice and/or data with a radio access network. For example, a personal communication service (PCS) phone, a wireless phone, a session initiation protocol (SIP) phone, a wireless local loop (WLL) station, a personal digital assistant (PDA) and other devices. The wireless terminal may also be referred to as a system, a subscriber unit, a subscriber station, a mobile station, a mobile, a remote station, an access point, a remote terminal, an access terminal, a user terminal, a user agent, a user device, or a user equipment (UE).

The base station (such as, access point) may refer to a device in an access network that communicates over the air-interface, through one or more sectors, with wireless terminals. The base station may act as a router between the wireless terminal and the rest of the access network, which can include an internet protocol (IP) network, by converting received air-interface frames to IP packets. The base station also coordinates management of attributes for the air interface. For example, the base station can be a base transceiver station (BTS) in GSM or CDMA, or a base station (NodeB) in WCDMA, or an evolved Node B (eNodB) in LTE, and the claims are not limited thereto.

The base station controller can be a base station controller (BSC) in GSM or CDMA, or a radio network controller (RNC) in WCDMA, and the claims are not limited thereto.

Furthermore, the term "system" and "network" may be used interchangeably herein. The term "and/or" herein is merely to describe association relationship between associated objects, and indicate there may be three types of relationship, for example, A and/or B can indicate three cases, that is, A exists individually, A exists together with B, and B exists individually. Furthermore, the character "/" generally indicates that the before and after associated objects are in an alternative relationship.

The network device may be an RNC when applied to a UMTS system; and the network device may be an eNodeB when applied to an LTE system.

Figure 2:
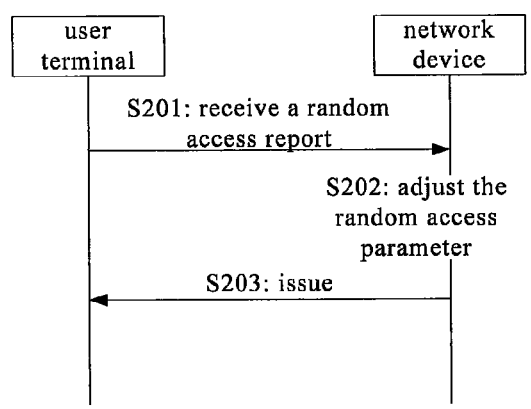
FIG. 2 is a signaling flow chart of a method for processing a random access parameter according to an embodiment.

Embodiments provide a method for processing a random access parameter, which relates to a network device, as shown in FIG. 2, and the method includes the following steps.

S201, a network device receives a random access report of a first cell reported by one or more user terminals, where a random access detection item recorded in the random access report includes at least one of number of times of preamble cycles in each random access, a reason for preamble transmission failure within each preamble cycle period and a random access delay.

Optionally, the random access detection item recorded in the random access report may further include at least one of an identifier of a random access cell, an identifier of a PLMN to which a random access cell belongs, information of time when a random access occurs, number of times of a random access, a random access type, a radio signal quality of a common pilot channel, a collision indicator, a system message failure indicator, and a redirection indicator.

For example, number of times of the random access is used for making statistics to number of times of random access failure, number of times of random access success and total number of times of random access, so as to obtain a random access success probability.

The PLMN identifier is used for uniquely identifying a public land mobile network in the whole network, and the cell identifier is used for uniquely identifying a cell in the public land mobile network, so that the network device can easily identify to adjust a random access parameter of the cell.

The information of time when a random access occurs is used for recording a time when the random access occurs, so that the network device can easily identify a reason for random access failure is that the parameter configuration is improper or a device failure occurs in a certain period. For example, because a time range for the device failure is knowable, then it can be identified that the random access failure within the period is caused by the device failure.

The number of times of preamble cycles in each random access indicates number of times of random access cycles recorded by a media access control layer in each random access, so that the network device can easily judge whether a maximum number of times of preamble cycles of a first cell is proper. For example, if number of times of preamble cycles in each random access of more than eight user terminals in ten user terminals reach a maximum number of times of cycles, then it shows that the maximum number of times of preamble cycles in the random access is set below the threshold, so that the maximum number of times of preamble cycles in the random access can be increased.

The reason for preamble transmission failure within each preamble transmission period includes that: a preamble transmission power reaches a maximum value, a preamble transmission reaches a maximum number of times of retransmission or negative acknowledgment is received on the acquisition indicator channel. The preamble transmission failure means that positive acknowledgment information is not received, or negative acknowledgment information is received on the acquisition indicator channel, when a preamble transmission reaches a maximum number of times of retransmission or a preamble transmission power reaches a maximum value. The reason for preamble transmission failure within each preamble period is recorded to facilitate a network side to judge the reason for random access failure. For example, when the reason for preamble transmission failure within each preamble cycle period in the random access report reported by one or more user terminals is that a ratio that number of times of retransmission reaches the maximum number of times of retransmission is greater than the proportional threshold for the number of times of preamble retransmission, the adjusting the random access parameter further includes: increasing a transmission power of a primary common pilot channel, and/or increasing uplink interference, and/or increasing a constant factor of random access channel demodulation, and/or increasing a power ramp step, and/or increasing a parameter for the maximum number of times of preamble retransmission.

Optionally, when the reason for preamble transmission failure within each preamble cycle period in the random access report reported by one or more user terminals is that a ratio that the preamble transmission power reaches the maximum value is greater than the proportional threshold for the preamble transmission power, the adjusting the random access parameter further includes: reducing a transmission power of a primary common pilot channel, and/or reducing uplink interference, and/or reducing a constant factor of random access channel demodulation, and/or reducing a power ramp step.

Optionally, when the reason for preamble transmission failure within each preamble cycle period in the random access report reported by one or more user terminals is that a ratio of receiving the negative acknowledgment information on the acquisition indicator channel is greater than the proportional threshold for negative acknowledgment information, the adjusting the random access parameter further includes: increasing random access resources.

The random access type is used for indicating that the user terminal uses a random access, or an enhanced random access, or an enhanced random access of 2 ms transmission time interval (TTI) length, or an enhanced random access of 10 ms TTI length, so as to further judge whether the random access failure is caused by improper configuration of a random access parameter or an enhanced random access parameter, or further judge whether the random access failure is caused by improper configuration of an enhanced random access parameter of 2 ms TTI length or an enhanced random access parameter of 10 ms TTI length. For example, if a difference between a probability of an enhanced random access failure and a probability of a random access failure is greater than a certain threshold, resources used by the enhanced random access need to be increased. For example, numbers of fractional dedicated physical channel (F-DPCH), and/or numbers of enhanced dedicated channel (E-DCH) relative grant channel (E-RGCH), and/or numbers of E-DCH Hybrid automatic repeat request (ARQ) indicator channel (E-HICH) are increased. For another example, if a difference between a probability of the 2 ms TTI length enhanced random access failure and a probability of the 10 ms TTI length enhanced random access failure is greater than a certain threshold, then numbers of enhanced random access resource corresponding to 2 ms TTI length need to be increased.

The radio signal quality of a common pilot channel may include at least one of a received power, a signal noise ratio and a path loss of the common pilot channel measured by the user terminal, the radio signal quality of the common pilot channel is recorded to facilitate the network device to analyze whether the reason for the random access failure is improper parameter configuration or poor radio signal quality. For example, if the received power of the common pilot channel measured by more than eight user terminals in ten user terminals is less than a normally received power value, or the measured signal noise ratio of the common pilot channel is less than a normal signal to noise ratio value, or the measured path loss of the common pilot channel is less than a normal path loss value, then it can be identified that the reason for the random access failure is that the radio signal quality is poor.

The random access delay refers to a time interval between initially transmitting a preamble by the user terminal and successful contention of resources, and the value is recorded to facilitate the network to evaluate a random access performance, and provide a reference for the network side to analyze whether the random access parameter configuration is proper. The successful contention of resources herein, in terms of a user terminal supporting a common enhanced dedicated channel, means that its own radio network temporary identification is received on an enhanced dedicated channel absolute grant channel during a collision monitoring period; in terms of a user terminal not supporting a common enhanced dedicated channel, the successful contention of resources means that a positive acknowledgment frame is received on the AICH. In some special cases, if a random access has reached a maximum preamble cycle period, but no successful contention of resources is achieved, the data packet will be discarded, and because there is no subsequent data transmission, the recorded random access delay refers to a time from initially transmitting the preamble by the user terminal to random access failure, where the random access failure means that no positive acknowledgment frame is received on the AICH when the preamble transmission has reached the maximum preamble cycle period.

The random access delay may also be defined as a time from transmitting a preamble by the user terminal to successful contention of resources in the random access, or random access failure in each random access process, here, the successful contention of resources refers to a network resource is obtained in the random access; the random access failure means that no network resource is obtained in the random access failure.

The random access delay may also be defined as a time from receiving a positive acknowledgment frame on the AICH by the terminal to receiving its own radio network temporary identification on an enhanced dedicated channel absolute grant channel during a collision monitoring period in each random access process.

The random access parameter recorded in contents of the random access report may further include number of times of preamble cycles within each preamble transmission period and a collision indicator.

The number of times of preamble transmission within each preamble cycle period indicates number of times of preamble transmission within each preamble period in each random access process, and the number of times of preamble transmission within each preamble cycle period is recorded to facilitate the network device to evaluate whether the maximum number of times of preamble transmission is proper. For example, when the reason for preamble transmission failure within each preamble cycle period in the random access report reported by one or more user terminals is that a ratio of reaching the maximum number of times of retransmission is greater than the proportional threshold for the number of times of preamble retransmission, the network device judges the maximum number of times of preamble retransmission is improper, and adjusts the random access parameter, for example, increases a transmission power of a primary common pilot channel, and/or increases uplink interference, and/or increases a constant factor of random access channel demodulation, and/or increases a power ramp step, and/or increases a parameter of the maximum number of times of preamble retransmission.

The collision indicator is used for indicating whether a collision occurs, the collision means that the user terminal fails to receive its own radio network temporary identification on an enhanced dedicated channel absolute grant channel during a collision monitoring period, or the user terminal receives a positive acknowledgment indicator on the AICH but fails to receive a response message within a maximum timer. For example, when a user terminal in an idle state receives a positive acknowledgment indicator on the AICH, a T300 timer will be started, an radio resource control (RRC) connection request message is transmitted, if an RRC connection setup message is not received before the T300 timer expires, it deems that a collision occurs; for another example, when a user terminal in a CELL_FACH state receives a positive acknowledgment indicator on the AICH, a T302 timer will be started, and a cell update message is transmitted, if a corresponding cell update confirmation message is not received before the T302 timer expires, it deems that a collision occurs. The collision indicator is counted to facilitate the network device to judge whether the random access resource or the enhanced random access resource configuration is proper. For example, if a difference between a probability of an enhanced random access failure and a probability of a random access failure is greater than a certain threshold, then the network device judges that the random access resource or the enhanced random access resource configuration is improper, and numbers of signatures used by the enhanced random access need to be increased.

The system message failure indicator is counted to facilitate the network device to judge whether the random access failure is caused by improper configuration of a random access parameter or the system message failure obtained by the user terminal. For example, when a probability of an enhanced random access failure caused by the system message failure is greater than a preset probability threshold, then it deems that the reason for the random access failure is that the system message obtained by the user terminal has been failed, rather than the improper random access parameter configuration. Particularly, the method for judging the system message failure is that, when the system message stored by the user terminal before the random access failure is different from the system message obtained after the random access failure, or when the user terminal initiates the random access in a target cell according to a system message of the target cell provided in a redirection message, and the random access fails, the system message failure is judged.

The redirection indicator is used for indicating that the current random access is a random access initiated after the user terminal is redirected by a network node from a source cell to the current cell, for example, a random access initiated when the user terminal residing in cell 1 is redirected by a network node (such as RNC) from cell 1 to cell 2, and the user terminal reselects cell 2. The information is recorded to facilitate judging whether the random access failure is caused by a mistake of redirection policy, for example, the random access failure of the user terminal is caused by a poor quality of a radio signal in a redirected target cell, for another example, the random access failure is caused by system message failure carried in the redirection indicator, the above cases for the random access failure are all caused by the mistake of redirection policy. If numbers of redirected user terminals in the user terminals of random access failure are greater than or equal to a preset threshold for the number of redirection terminal, then it can be identified that the reason for the random access failure is caused by system message failure obtained by the terminal.

It should be noted that, the random access resource mentioned in the embodiments refer to a configuration used by the random access, such as a random access channel, a F-DPCH channel, an E-RGCH channel, an E-HICH channel. Increasing the random access resource refers to increasing numbers of the random access channels, and/or the F-DPCH channels, and/or the E-RGCH channels, and/or the E-HICH channels.

S202, the network device performs random access detection item statistics according to the random access report and obtains a statistical value, if the statistical value reaches a preset threshold, and then adjusts the random access parameter of the first cell.

The preset threshold, which can be stored in a network device, may include at least one of a random access success probability threshold, a proportional threshold for number of times of preamble cycles, a proportional threshold for number of times of preamble retransmission, a proportional threshold for a preamble transmission power, a proportional threshold for negative acknowledgment information, and a random access delay threshold. When the value of the random access parameter reaches a preset threshold, the adjusting the random access parameter may include the following manners.

In another embodiment, when the statistics show that a ratio of the number of times of random access success in the random access report reported by one or more user terminals to the total number of times of random access is less than the random access success probability threshold, the adjusting the random access parameter of the first cell further includes: increasing random access resources of the first cell. For example, numbers of the random access channels, and/or the F-DPCH channels, and/or the E-RGCH channels, and/or the E-HICH channels of the first cell are increased.

In another embodiment, when the statistics show that a ratio that the number of times of preamble cycles in each random access reaches the maximum value in the random access report reported by one or more user terminals reaches the proportional threshold for the number of times of preamble cycles, the adjusting the random access parameter of the first cell further includes: increasing a maximum number of times of preamble cycles in the random access of the first cell.

In another embodiment, when the statistics show that the reason for preamble transmission failure within each preamble cycle period in the random access report reported by one or more user terminals is that a ratio of reaching the maximum number of times of retransmission is greater than the proportional threshold for number of times of preamble retransmission, the adjusting the random access parameter of the first cell further includes: increasing a transmission power of a primary common pilot channel of the first cell, and/or increasing uplink interference, and/or increasing a constant factor of random access channel demodulation, and/or increasing a power ramp step, and/or increasing a parameter of the maximum number of times of preamble retransmission.

In another embodiment, when the statistics show that the reason for preamble transmission failure within each preamble cycle period in the random access report reported by one or more user terminals is that a ratio that the preamble transmission power reaches a maximum value is greater than the proportional threshold for the preamble transmission power, the adjusting the random access parameter of the first cell further includes: reducing a transmission power of a primary common pilot channel of the first cell, and/or reducing uplink interference, and/or reducing a constant factor of random access channel demodulation, and/or reducing a power ramp step.

In another embodiment, when the statistics show that the reason for preamble transmission failure within each preamble cycle period in the random access report reported by one or more user terminals is that a ratio of receiving the negative acknowledgment information on the acquisition indicator channel is greater than the proportional threshold for negative acknowledgment information, the adjusting the random access parameter of the first cell further includes: increasing random access resources of the first cell.

In another embodiment, when the random access parameter recorded in contents of the random access report includes a collision indicator, statistic are performed for the random access reports reported by multiple user terminals, and if a collision probability is greater than a threshold for the collision probability, the adjusting the random access parameter further includes: increasing resource numbers of the common enhanced dedicated channel.

In another embodiment, when the statistics show that the random access delay in the random access report reported by one or more user terminals is greater than the random access delay threshold, the adjusting the random access parameter of the first cell further includes: increasing random access resources of the first cell.

It should be noted that, the resources used in the above methods all refer to a configuration used by the random access, such as a random access channel, and an access time slot. Each method for adjusting the parameter described above respectively corresponds to a case for adjusting the parameter when a value for the random access parameter reaches a preset threshold. Because the random access parameter recorded in contents of the random access report may include at least one of number of times of a random access, an identifier of a random access cell, an identifier of a PLMN to which a random access cell belongs, information of time when a random access occurs, number of times of preamble cycles in each random access, a reason for preamble transmission failure within each preamble cycle period, a random access type, a radio signal quality of a common pilot channel and a random access delay, when the contents of the random access report include two or more parameters, the random access parameters are adjusted according to a method for adjusting a parameter corresponding to the two or more parameters in the above method for adjusting the parameter.

The several methods illustrated above are only several possible cases of adjusting the random access parameter, in a practical operation, the method for adjusting the random access parameter is not limited thereto, and other methods for adjusting the random access parameter when the random access parameter information reaches a preset threshold shall all fall into the protection scope claims.

S203, the network device issues the adjusted random access parameter to the user terminal belonging to the first cell.

For example, the network device may issue the adjusted random access parameter to the user terminal through the system message.

Compared the method for processing the random access parameter provided in the embodiments with the prior art, the random access detection item recorded in the random access report of the first cell which is reported by one or more user terminals and is received by a network side includes at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 3:
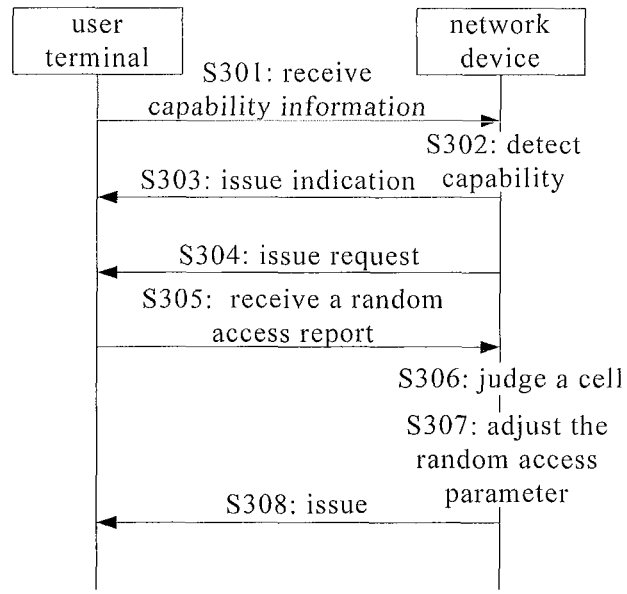
FIG. 3 is a signaling flow chart of a method for processing a random access parameter according to another embodiment.

Embodiments provide another method for processing a random access parameter, which relates to a network device, as shown in FIG. 3, and the method includes the following steps.

S301, a network device receives capability information recording whether one or more user terminals support random access parameter optimization, reported by one or more user terminals.

For example, the capability information received by the network device may be included in a radio resource control (RRC) connection setup complete message reported by the user terminal or a capability response message of the user terminal.

S302, the network device detects, according to the capability information, whether one or more user terminals support the random access parameter optimization.

Optionally, when the network device detects that the user terminal supports the random access parameter optimization, the network device may indicate the user terminal to perform a random access parameter optimization process based on a periodic or an event-triggered mechanism, for example, the network device indicates the user terminal to perform the random access parameter optimization process every other month; for another example, when the number of users accessed in a certain period which is counted by the network device is less than a certain number, the network device indicates the user terminal to perform the random access parameter optimization process.

S303, the network device issues indication information for indicating one or more user terminals to record the random access report, if one or more user terminals support the random access parameter optimization.

For example, the network device may indicate the user terminal to record the random access report in the random access by issuing a log configuration message.

S304, the network device issues request information for requesting one or more user terminals to report the random access report.

For example, the network device may notify the user terminal of reporting the random access report by issuing an information request message to the user terminal at an appropriate moment. Particularly, the appropriate moment refers to a time not affecting normal communication services, for example, the network device may issue request information when its own load is less than a certain threshold.

Further, step S304 may include the following circumstances.

Circumstance 1: when the method for optimizing the random access parameter includes steps S301 to S303, after the network device issues indication information for indicating the user terminal to record the random access report, step S304 is executed.

Circumstance 2: when the method for optimizing the random access parameter does not include steps S301 to S303, step S304 is directly executed, then the user terminal supporting random access optimization needs to record the random access report in each random access.

S305, the network device receives a random access report reported by one or more user terminals, where the random access detection item recorded in the random access report includes at least one of number of times of preamble cycles in each random access, a reason for preamble transmission failure within each preamble cycle period and a random access delay.

Details of this step may be obtained with reference to step S201, and will not be repeated here any further.

S306, if the random access report received by a network device to which the first cell belongs includes access information of a second cell, the network device forwards the access information of the second cell to a network device to which the second cell belongs, where the network device to which the first cell belongs is different from the network device to which the second cell belongs.

For example, in a UMTS system, if the cell recorded by the random access cell identifier in the random access report which is received by the network device RNC1 is not the cell corresponding to a local network device RNC1 but a cell corresponding to a network device RNC2, the random access report is then forwarded by the RNC1 to the network device RNC2 corresponding to the cell recorded by the cell identifier.

When an LTE system and a UMTS system coexist, if the cell recorded by the random access cell identifier in the random access report which is received by a network device eNodeB in the LTE system is not the cell corresponding to a local network device eNodeB but a cell corresponding to a network device RNC in the UMTS system, the random access report is then forwarded by the eNodeB to the network device RNC corresponding to the cell recorded by the cell identifier.

S307, the network device performs random access detection item statistics according to the random access report, if the value for the random access parameter reaches a preset threshold, and then adjusts the random access parameter of the first cell.

Details of this step may be obtained with reference to step S202, and will not be repeated here any further.

S308, the network device issues the adjusted random access parameter to the user terminal to which the first cell belongs.

Details of this step may be obtained with reference to step S203, and will not be repeated here any further.

Compared the method for processing the random access parameter provided in the embodiments with the prior art, the random access detection item recorded in the random access report of the first cell which is reported by one or more user terminals and is received by a network side includes at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 4:
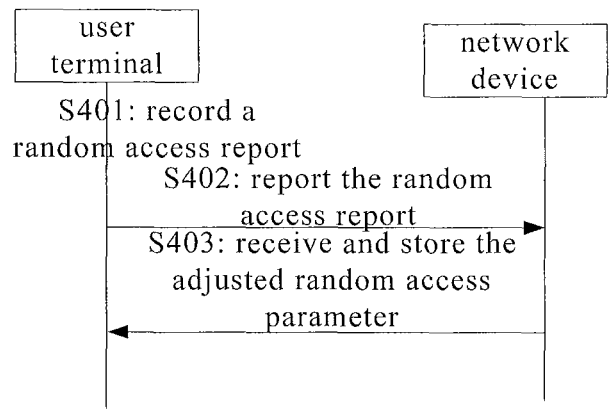
FIG. 4 is a signaling flow chart of a method for processing a random access parameter according to another embodiment.

Embodiments provide another method for processing a random access parameter, which relates to a user terminal, as shown in FIG. 4, and the method includes the following steps.

S401, the user terminal records a random access report, and the random access detection item recorded in the random access report includes at least one of number of times of preamble cycles in each random access, a reason for preamble transmission failure within each preamble cycle period and a random access delay.

Optionally, the random access detection item recorded in the random access report further may include at least one of an identifier of a random access cell, an identifier of a PLMN to which a random access cell belongs, information of time when a random access occurs, number of times of random access, a random access type, a radio signal quality of a common pilot channel, a collision indicator, a system message failure indicator, and a redirection indicator.

For example, because the amount of the random access report reported by the user terminal is large, a memory and air interface signaling of the user terminal will be greatly affected, and therefore, the process of recording the random access report may be optimized as follows:

When the random access report records information of successful random access, the random access report records the identifier of the random access cell; optionally, the random access report may further record the PLMN identifier and/or the random access type; when the random access report records information of failed random access, the random access report records at least one of the identifier of the random access cell, a PLMN identifier, information of time when a random access occurs, number of times of preamble cycles in each random access, a reason for preamble transmission failure within each preamble cycle period, a collision indicator, a random access type, a radio signal quality of a common pilot channel and a random access delay.

When the number of times of transmitting the preamble or the number of times of preamble cycles in the random access reaches a first preset threshold, the random access report records at least one of number of times of random access success, an identifier of a random access cell, a PLMN identifier, information of time when a random access occurs, number of times of preamble cycles in each random access, a reason for preamble transmission failure within each preamble cycle period, number of times of preamble transmission within each preamble cycle period, a collision indicator, a random access type, a radio signal quality of a common pilot channel and a random access delay; when the number of times of transmitting the preamble or the number of times of preamble cycles in the random access fails to reach the first preset threshold, the random access report records the cell identifier, optional, the random access report may further record the PLMN identifier and/or the random access type.

When one of a value of number of times of random access failure m/total number of times of access n, an average access delay, an average number of times of preamble transmission, and number of times of preamble cycle ramp is greater than or equal to a second preset threshold, store the random access report; when one of a value of m/n, an average access delay, an average number of times of preamble transmission, and number of times of preamble cycle ramp is less than the second preset threshold, delete the random access report.

It should be noted that, the first preset threshold and the second threshold may be notified by the network device to the user terminal, or may be a value preset by an protocol. The random access parameter recorded in contents of the random access report may also include a number of times of preamble transmissions within each preamble cycle period and a collision indicator.

S402, the user terminal reports the random access report to the network device.

Optionally, when one of a value of m/n, an average access delay, an average number of times of preamble transmission, and number of times of preamble cycle ramp is greater than the second preset threshold or the user terminal records the random access report, the user terminal may report the random access report actively. Here, actively reporting the random access report may include at least the following circumstances: when one of a value of m/n, an average access delay, an average number of times of preamble transmission, and number of times of preamble cycle ramp is greater than a second preset threshold or the user terminal records the random access report, immediately report the random access report, that is, the threshold triggers the user terminal to transmit a UL message carrying the random access report to the network device; when one of a value of m/n, an average access delay, an average number of times of preamble transmission, and number of times of preamble cycle ramp is greater than a second preset threshold or the user terminal records the random access report, not report the random access report immediately, and the random access report is carried in an uplink message and reported until the terminal transmits the uplink message.

S403, the user terminal receives and stores the random access parameter adjusted by the network device.

For example, detailed process of the network device for adjusting the random access parameter included in contents of the random access report reported by the user terminal may be obtained with reference to step S202, and will not be repeated here any further.

It should be noted that, the receiving and storing the random access parameter adjusted by the network device by the user terminal may include one of the three following circumstances: 1, deleting the originally stored random access parameter, and storing a new random access parameter; 2, replacing the random access parameter stored by the user terminal with a new random access parameter if the random access parameter changes, and not performing any processing if the random access parameter does not change; 3, directly storing the random access parameter after receiving the random access parameter, if no random access parameter is previously stored by the user terminal.

Compared the method for processing the random access parameter provided in the embodiments with the prior art, the random access detection item recorded in the random access report of the first cell which is reported by one or more user terminals, received by a network side includes at least one of number of times of random access, number of times of preamble cycles in each random access, a reason for preamble transmission failure within each preamble cycle period, a random access type, a radio signal quality of a common pilot channel and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 5:
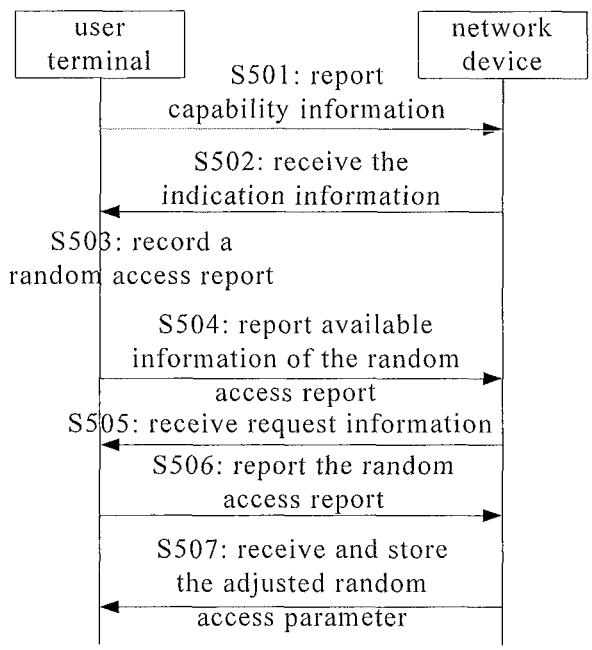
FIG. 5 is a signaling flow chart of a method for processing a random access parameter according to another embodiment.

Embodiments provide another method for processing a random access parameter, which relates to a user terminal, as shown in FIG. 5, and the method includes the following steps:

S501, the user terminal reports capability information recording whether to support random access parameter optimization to the network device.

For example, the capability information recording whether supports its own random access parameter optimization, which is reported by the user terminal, may be included in an RRC connection setup complete message reported by the user terminal or a capability acknowledgment message of the user terminal, and be reported to the network device.

S502, the user terminal receives the indication information for indicating the user terminal to record the random access report, where the indication information is issued by the network device after judging the capability information and acknowledging that the random access parameter optimization is supported.

Optionally, when the network device detects that the user terminal supports the random access parameter optimization, the network device may indicate the user terminal to perform a random access parameter optimization process based on a periodic or an event-triggered mechanism, for example, the network device indicates the user terminal to perform the random access parameter optimization process every other month; for another example, when the number of users accessed in a certain period which is counted by the network device is less than a certain number, the network device indicates the user terminal to perform the random access parameter optimization process.

S503, the user terminal records a random access report, where the random access detection item recorded in the random access report includes at least one of number of times of preamble cycles in each random access, a reason for preamble transmission failure within each preamble cycle period and a random access delay.

Further, step S503 may include the following circumstances.

Circumstance 1: the method for optimizing the random access may include steps S501 to S502, that is, the user terminal receives an indicator for optimizing the random access issued by the network device, and records the random access report in each random access;

Circumstance 2: the method for optimizing the random access may do not include steps S501 to S502, that is, the user terminal capable of supporting random access parameter optimization in default always records the random access report in each random access by fault.

Details of this step may be obtained with reference to step S401, and will not be repeated here any further.

S504, the user terminal reports available information of the random access report to the network device, and the available information of the random access report is used for reporting to the network device that the user terminal records the random access report.

For example, when one of a value of m/n, an average access delay, an average number of times of preamble transmission, and number of times of preamble cycle ramp is greater than a second preset threshold, the user terminal immediately reports the available information of the random access report to the network device, that is, the threshold triggers the user terminal to transmit a UL message carrying the information to the network device, or the terminal incidentally report the available information of the random access report to the network device when transmitting the uplink message, where the available information of the random access report is carried in the uplink message. Step S504 is an optional step and may be not included in the method.

S505, the user terminal receives request information for requesting to report the random access report to the network device which is issued by the network device.

For example, the network device may notify the user terminal of reporting the random access report by issuing an information request message to the user terminal at an appropriate moment. Particularly, the appropriate moment refers to a time not affecting normal communication services, for example, the network device can issue request information when its own load is less than a certain threshold.

S506, the user terminal reports the random access report to the network device.

Details of this step may be obtained with reference to step S402, and will not be repeated here any further.

S507, the user terminal receives and stores the random access parameter adjusted by the network device.

Details of this step may be obtained with reference to step S403, and will not be repeated here any further.

Compared the method for processing the random access parameter provided in the embodiments with the prior art, the random access detection item recorded in the random access report of the first cell which is reported by one or more user terminals and is received by a network side includes at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 6:
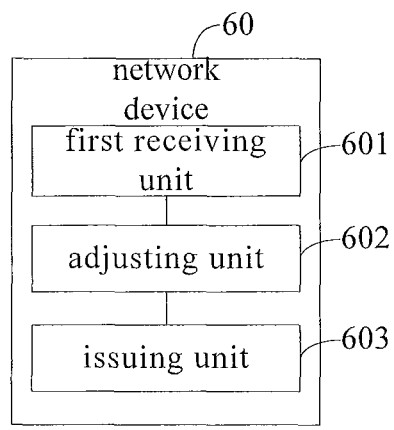
FIG. 6 is a schematic structural diagram of a network device according to another embodiment.

The network device provided in the embodiments may be an RNC or an eNodeB. Embodiments provide a network device 60, as shown in FIG. 6, including: a first receiving unit 601, an adjusting unit 602 and an issuing unit 603.

The first receiving unit 601 is configured to receive a random access report reported by a user terminal, where the random access detection item recorded in the random access report includes at least one of number of times of preamble cycles in each random access, a reason for preamble transmission failure within each preamble cycle period and a random access delay.

Optionally, the random access detection item recorded in the random access report may further includes at least one of an identifier of a random access cell, an identifier of a PLMN to which the random access cell belongs, information of time when a random access occurs, number of times of random access, a random access type, a radio signal quality of a common pilot channel, a collision indicator, a system message failure indicator, and a redirection indicator.

For example, number of times of the random access is used for making statistics to number of times of random access failure, number of times of random access success and total number of times of random access, so as to obtain a random access success probability.

The PLMN identifier is used for uniquely identifying a public land mobile network in the whole network, and the cell identifier is used for uniquely identifying a cell in the public land mobile network, so that the network device can easily identify to adjust a random access parameter of the cell.

The information of time when a random access occurs is used for recording a time when the random access occurs, so that the network device can easily identify a reason for random access failure is that the parameter configuration is improper or a device failure occurs in a certain period. For example, because a time range for the device failure is knowable, then it can be identified that the random access failure within the period is caused by the device failure.

The number of times of preamble cycles in each random access indicates number of times of random access cycles recorded by a media access control layer in each random access, so that the network device can easily judge whether a maximum number of times of preamble cycles of a first cell is proper. For example, if number of times of preamble cycles in each random access of more than eight user terminals in ten user terminals reach a maximum number of times of cycles, then it shows that the maximum number of times of preamble cycles in the random access is set below the threshold, so that the maximum number of times of preamble cycles in the random access can be increased.

The reason for preamble transmission failure within each preamble transmission period includes that: a preamble transmission power reaches a maximum value, a preamble transmission reaches a maximum number of times of retransmission or negative acknowledgment is received on the acquisition indicator channel. The preamble transmission failure means that positive acknowledgment information is not received, or negative acknowledgment information is received on the acquisition indicator channel, when a preamble transmission reaches a maximum number of times of retransmission or a preamble transmission power reaches a maximum value. The reason for preamble transmission failure within each preamble period is recorded to facilitate a network side to judge the reason for random access failure. For example, when the reason for preamble transmission failure within each preamble cycle period in the random access report reported by one or more user terminals is that a ratio that number of times of retransmission reaches the maximum number of times of retransmission is greater than the proportional threshold for the number of times of preamble retransmission, the adjusting the random access parameter further includes: increasing a transmission power of a primary common pilot channel, and/or increasing uplink interference, and/or increasing a constant factor of random access channel demodulation, and/or increasing a power ramp step, and/or increasing a parameter for the maximum number of times of preamble retransmission.

Optionally, when the reason for preamble transmission failure within each preamble cycle period in the random access report reported by one or more user terminals is that a ratio that the preamble transmission power reaches the maximum value is greater than the proportional threshold for the preamble transmission power, the adjusting the random access parameter further includes: reducing a transmission power of a primary common pilot channel, and/or reducing uplink interference, and/or reducing a constant factor of random access channel demodulation, and/or reducing a power ramp step.

Optionally, when the reason for preamble transmission failure within each preamble cycle period in the random access report reported by one or more user terminals is that a ratio of receiving the negative acknowledgment information on the acquisition indicator channel is greater than the proportional threshold for negative acknowledgment information, the adjusting the random access parameter further includes: increasing random access resources.

The random access type is used for indicating that the user terminal uses a random access, or an enhanced random access, or an enhanced random access of 2 ms transmission time interval (TTI) length, or an enhanced random access of 10 ms TTI length, so as to further judge whether the random access failure is caused by improper configuration of a random access parameter or an enhanced random access parameter, or further judge whether the random access failure is caused by improper configuration of an enhanced random access parameter of 2 ms TTI length or an enhanced random access parameter of 10 ms TTI length. For example, if a difference between a probability of an enhanced random access failure and a probability of a random access failure is greater than a certain threshold, resources used by the enhanced random access need to be increased. For example, numbers the F-DPCH channels, and/or the E-RGCH channels, and/or the E-HICH channels of the first cell are increased. For another example, if a difference between a probability of the 2 ms TTI length enhanced random access failure and a probability of the 10 ms TTI length enhanced random access failure is greater than a certain threshold, then numbers of enhanced random access resource corresponding to 2 ms TTI length need to be increased.

The radio signal quality of a common pilot channel may include at least one of a received power, a signal noise ratio and a path loss of the common pilot channel measured by the user terminal, the radio signal quality of the common pilot channel is recorded to facilitate the network device to analyze whether the reason for the random access failure is improper parameter configuration or poor radio signal quality. For example, if the received power of the common pilot channel measured by more than eight user terminals in ten user terminals is less than a normally received power value, or the measured signal noise ratio of the common pilot channel is less than a normal signal to noise ratio value, or the measured path loss of the common pilot channel is less than a normal path loss value, then it can be identified that the reason for the random access failure is that the radio signal quality is poor.

The random access delay refers to a time interval between initially transmitting a preamble by the user terminal and successful contention of resources, and the value is recorded to facilitate the network to evaluate a random access performance, and provide a reference for the network side to analyze whether the random access parameter configuration is proper. The successful contention of resources herein, in terms of a user terminal supporting a common enhanced dedicated channel, means that its own radio network temporary identification is received on an enhanced dedicated channel absolute grant channel during a collision monitoring period; in terms of a user terminal not supporting a common enhanced dedicated channel, the successful contention of resources means that a positive acknowledgment frame is received on the AICH. In some special cases, if a random access has reached a maximum preamble cycle period, but no successful contention of resources is achieved, the data packet will be discarded, and because there is no subsequent data transmission, the recorded random access delay refers to a time from initially transmitting the preamble by the user terminal to random access failure, where the random access failure means that no positive acknowledgment frame is received on the AICH when the preamble transmission has reached the maximum preamble cycle period.

The random access delay may also be defined as a time from transmitting a preamble by the user terminal to successful contention of resources in the random access, or random access failure in each random access process, here, the successful contention of resources refers to a network resource is obtained in the random access; the random access failure means that no network resource is obtained in the random access failure.

The random access delay may also be defined as a time from receiving a positive acknowledgment frame on the AICH by the terminal to receiving its own radio network temporary identification on an enhanced dedicated channel absolute grant channel during a collision monitoring period in each random access process.

The random access parameter recorded in contents of the random access report may further include number of times of preamble cycles within each preamble transmission period and a collision indicator.

The number of times of preamble transmission within each preamble cycle period indicates number of times of preamble transmission within each preamble period in each random access process, and the number of times of preamble transmission within each preamble cycle period is recorded to facilitate the network device to evaluate whether the maximum number of times of preamble transmission is proper. For example, when the reason for preamble transmission failure within each preamble cycle period in the random access report reported by one or more user terminals is that a ratio of reaching the maximum number of times of retransmission is greater than the proportional threshold for the number of times of preamble retransmission, the network device judges the maximum number of times of preamble retransmission is improper, and adjusts the random access parameter, for example, increases a transmission power of a primary common pilot channel, and/or increases uplink interference, and/or increases a constant factor of random access channel demodulation, and/or increases a power ramp step, and/or increases a parameter of the maximum number of times of preamble retransmission.

The collision indicator is used for indicating whether a collision occurs, the collision means that the user terminal fails to receive its own radio network temporary identification on an enhanced dedicated channel absolute grant channel during a collision monitoring period, or the user terminal receives a positive acknowledgment indicator on the AICH but fails to receive a response message within a maximum timer. For example, when a user terminal in an idle state receives a positive acknowledgment indicator on the AICH, a T300 timer will be started, an RRC connection request message is transmitted, if an RRC connection setup message is not received before the T300 timer expires, it deems that a collision occurs; for another example, when a user terminal in a CELL_FACH state receives a positive acknowledgment indicator on the AICH, a T302 timer will be started, and a cell update message is transmitted, if a corresponding cell update confirmation message is not received before the T302 timer expires, it deems that a collision occurs. The collision indicator is counted to facilitate the network device to judge whether the random access resource or the enhanced random access resource configuration is proper. For example, if a difference between a probability of an enhanced random access failure and a probability of a random access failure is greater than a certain threshold, then the network device judges that the random access resource or the enhanced random access resource configuration is improper, and numbers of signatures used by the enhanced random access need to be increased.

The system message failure indicator is counted to facilitate the network device to judge whether the random access failure is caused by improper configuration of a random access parameter or the system message failure obtained by the user terminal. For example, when a probability of an enhanced random access failure caused by the system message failure is greater than a preset probability threshold, then it deems that the reason for the random access failure is that the system message obtained by the user terminal has been failed, rather than the improper random access parameter configuration. Particularly, the method for judging the system message failure is that, when the system message stored by the user terminal before the random access failure is different from the system message obtained after the random access failure, or when the user terminal initiates the random access in a target cell according to a system message of the target cell provided in a redirection message, and the random access fails, the system message failure is judged.

The redirection indicator is used for indicating that the current random access is a random access initiated after the user terminal is redirected by a network node from a source cell to the current cell, for example, a random access initiated when the user terminal residing in cell 1 is redirected by a network node (such as RNC) from cell 1 to cell 2, and the user terminal reselects cell 2. The information is recorded to facilitate judging whether the random access failure is caused by a mistake of redirection policy, for example, the random access failure of the user terminal is caused by a poor quality of a radio signal in a redirected target cell, for another example, the random access failure is caused by system message failure carried in the redirection indicator, the above cases for the random access failure are all caused by the mistake of redirection policy. If numbers of redirected user terminals in the user terminals of random access failure are greater than or equal to a preset threshold for the number of redirection terminal, then it can be identified that the reason for the random access failure is caused by system message failure obtained by the terminal.

The adjusting unit 602 is configured to perform random access detection item statistics according to the random access report and obtain a statistical value, if the statistical value reaches a preset threshold, then adjust the random access parameter of the first cell.

For example, the preset threshold includes at least one of a random access success probability threshold, a proportional threshold for number of times of preamble cycles, a proportional threshold for number of times of preamble retransmission, a proportional threshold for a preamble transmission power, a proportional threshold for negative acknowledgment information, and a random access delay threshold.

The issuing unit 603 is configured to issue the adjusted random access parameter to the user terminal belonging to the first cell.

For example, the issuing unit 603 may issue the adjusted random access parameter to the user terminal by attaching the adjusted random access parameter to the system message.

Figure 7A:
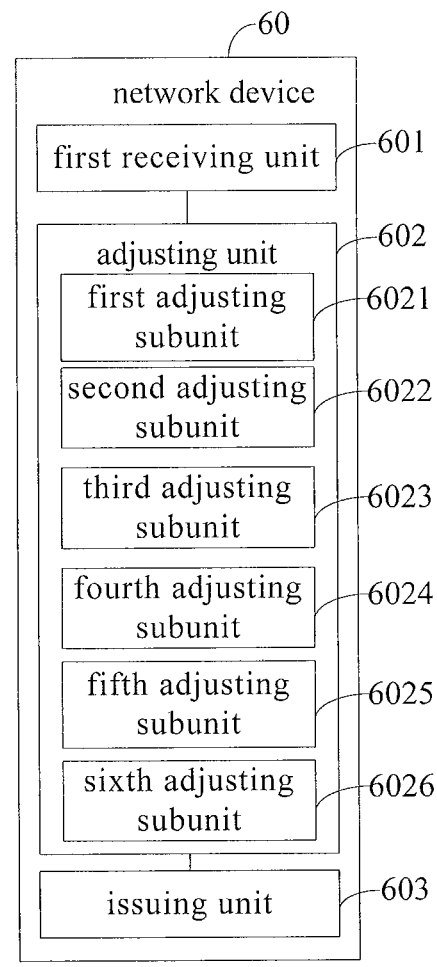
FIG. 7a is a schematic structural diagram of another network device according to another embodiment.

Further, as shown in FIG. 7a, the adjusting unit 602 further includes:

A first adjusting subunit 6021, configured to increase random access resources of the first cell, when a ratio of the number of times of random access success in the random access report of the first cell, reported by one or more user terminals to the total number of times of random access is less than the random access success probability threshold.

A second adjusting subunit 6022, configured to increase a maximum number of times of cycles in the random access of the first cell, when a ratio that the number of times of preamble cycles in each random access reaches maximum value in the random access report of the first cell, reported by one or more user terminals reaches the proportional threshold for the number of times of preamble cycles.

A third adjusting subunit 6023, configured to increase a transmission power of a primary common pilot channel of the first cell, and/or increase uplink interference, and/or increase a constant factor of random access channel demodulation, and/or increase a power ramp step, and/or increase a parameter of a maximum number of times of preamble retransmission, when a reason for preamble transmission failure within each preamble cycle period in the random access report of the first cell, reported by one or more user terminals is that a ratio of reaching the maximum number of times of retransmission is greater than the proportional threshold for the number of times of preamble retransmission.

A fourth adjusting subunit 6024, configured to reduce a transmission power of a primary common pilot channel of the first cell, and/or reduce uplink interference, and/or reduce a constant factor of random access channel demodulation, and/or reduce a power ramp step, when the reason for preamble transmission failure within each preamble cycle period in the random access report of the first cell, reported by one or more user terminals is that a ratio that the preamble transmission power reaches a maximum value is greater than the proportional threshold for the preamble transmission power.

A fifth adjusting subunit 6025, configured to increase random access resources of the first cell, when the reason for preamble transmission failure within each preamble cycle period in the random access report of the first cell, reported by one or more user terminals is that a ratio of receiving the negative acknowledgment information on the acquisition indicator channel is greater than the proportional threshold for negative acknowledgment information.

A sixth adjusting subunit 6026, configured to increase random access resources of the first cell, when the random access delay in the random access report reported by one or more user terminals is greater than the random access delay threshold.

Figure 7B:
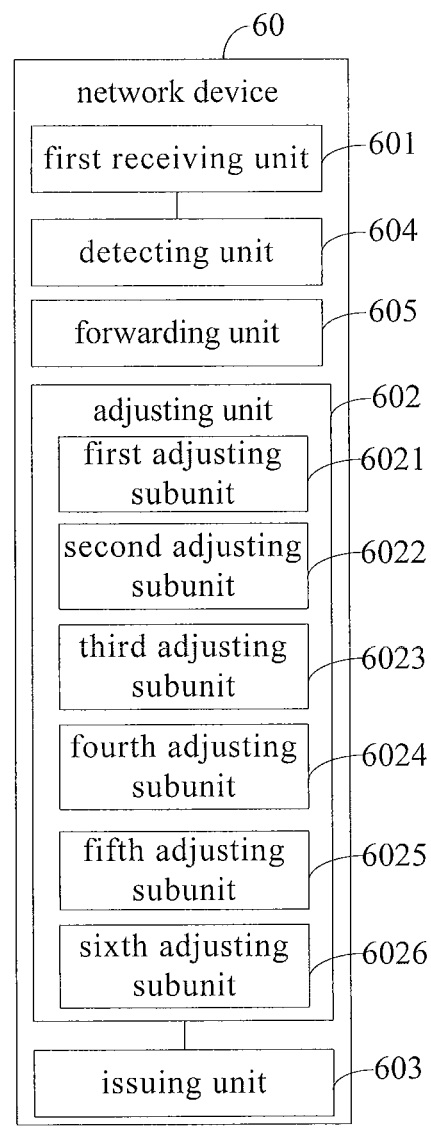
FIG. 7b is a schematic structural diagram of another network device according to another embodiment.

Still further, as shown in FIG. 7b, the network device 60 further includes:

A detecting unit 604, configured to detect whether a user terminal supports the random access parameter optimization, according to the capability information recording whether the user terminal supports random access parameter optimization, reported by the user terminals.

A forwarding unit 605, if the cell recorded by the random access cell identifier in the random access report is not the cell corresponding to a local network device, the random access report is then forwarded to the network device corresponding to the cell recorded by the cell identifier.

The first receiving unit 601 is further configured to receive capability information recording whether the user terminal supports random access parameter optimization, reported by the user terminal.

The issuing unit 603 is further configured to issue indication information for indicating the user terminal to record the random access report, if the user terminal supports the random access parameter optimization; and/or issue request information, for requesting the user terminal to report the random access report.

Compared the network device provided in the embodiments with the prior art, the random access detection item recorded in the random access report of the first cell which is reported by one or more user terminals and is received by a network side include at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 8:
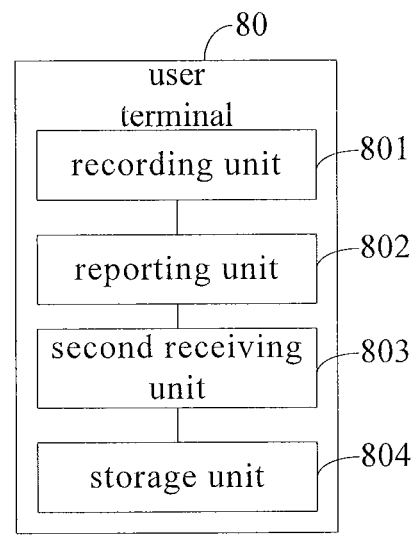
FIG. 8 is a schematic structural diagram of a user terminal according to another embodiment.

Embodiments provide a user terminal 80, as shown in FIG. 8, including: a recording unit 801, a reporting unit 802, a second receiving unit 803 and a storage unit 804.

The recording unit 801 is configured to record a random access report, where the random access detection item recorded in the random access report includes at least one of number of times of preamble cycles in each random access, a reason for preamble transmission failure within each preamble cycle period and a random access delay.

Optionally, the random access detection item recorded in the random access report further may include at least one of an identifier of a random access cell, an identifier of a PLMN to which the random access cell belongs, information of time when a random access occurs, number of times of random access, a random access type, a radio signal quality of a common pilot channel, a collision indicator, a system message failure indicator, and a redirection indicator.

For example, the detailed process of recording the random access report by the recording unit 801 may be obtained with reference to step S401 in the above embodiments, and is not repeated here any further.

The reporting unit 802 is configured to report the random access report to the network device.

For example, the reporting unit 802 may reports the random access report to the network device by attaching the random access report to response information of the user terminal.

Optionally, when one of a value of m/n, an average access delay, an average number of times of preamble transmission, and number of times of preamble cycle ramp is greater than the second preset threshold or the user terminal records the random access report, the reporting unit 802 may report the random access report actively. Here, actively reporting the random access report may include at least the following circumstances: when one of a value of m/n, an average access delay, an average number of times of preamble transmission, and number of times of preamble cycle ramp is greater than a second preset threshold, immediately report the random access report, that is, the threshold triggers the user terminal to transmit a UL message carrying the random access report to the network device; when one of a value of m/n, an average access delay, an average number of times of preamble transmission, and number of times of preamble cycle ramp is greater than a second preset threshold, not report the random access report immediately, and the random access report is carried in an uplink message and reported until the terminal transmits the uplink message.

Further, the reporting unit 802 is further configured to report capability information recording whether the user terminal 80 supports random access parameter optimization to the network device; report available information of the random access report to the network device, where the available information of the random access report is used for reporting to the network device that the user terminal records the random access report.

The second receiving unit 803 is configured to receive the random access parameter adjusted by the network device.

The second receiving unit 803 is further configured to receive indication information for indicating to record the random access report, where the indication information is issued by the network device after judging the capability information and acknowledging that the random access parameter optimization is supported; and/or receive request information, for requesting to report the random access report to the network device, issued by the network device.

The storage unit 804 is configured to store the random access parameter adjusted by the network device.

Compared the user terminal provided in the embodiments with the prior art, the random access detection item recorded in the random access report of the first cell which is reported by one or more user terminals includes at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 9:
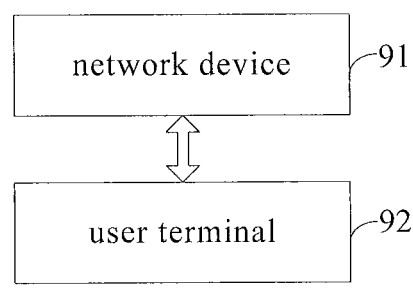
FIG. 9 is a schematic structural diagram of a system for processing a random access parameter according to another embodiment.

Embodiments provide a system for processing a random access parameter, as shown in FIG. 9, including a network device 91 and a user terminal 92.

For example, the random access parameter optimization system may include a plurality of user terminals 92.

The network device 91 and the user terminal 92 in this embodiment have the same structures with those in the above embodiments, and will not be repeated here any further.

Compared the system for processing the random access parameter provided in the embodiments with the prior art, the random access detection item recorded in the random access report of the first cell which is reported by one or more user terminals and is received by a network side includes at least one of number of times of preamble cycles in each random access, a reason for preamble transmission failure within each preamble cycle period and a random access delay; random access detection item statistics is performed according to the random access report, and if the statistical value reaches a preset threshold, then the random access parameter of the first cell is adjusted. Because contents of the random access report are added, the random access report includes more random access parameter information, so that the random access parameter can be adjusted more carefully and properly according to preset standard configuration information, and thus a success rate of random access can be improved.

Figure 10:
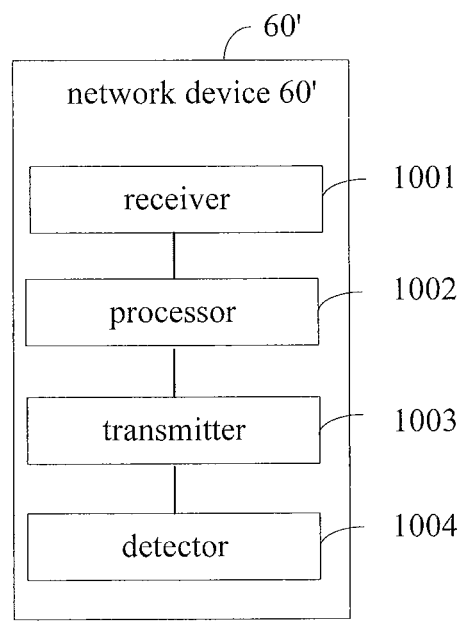
FIG. 10 is a schematic structural diagram of another network device according to another embodiment.

As shown in FIG. 10, another embodiment provides a network device 60', including: a receiver 1001, configured to receive a random access report reported by one or more user terminals, where the report includes the random access report of the first cell, reported by one or more user terminals, and the random access detection item recorded in the random access report includes at least one of number of times of preamble cycles in each random access, a reason for preamble transmission failure within each preamble cycle period and a random access delay; a processor 1002, configured to perform random access detection item statistics according to the random access report and obtain a statistical value, if the statistical value reaches a preset threshold, adjust the random access parameter of the first cell; and a transmitter 1003, configured to issue the adjusted random access parameter to a user terminal belonging to the first cell.

In another embodiment, the random access detection item recorded in the random access report further includes at least one of an identifier of a random access cell, an identifier of a PLMN to which a random access cell belongs, information of time when a random access occurs, number of times of random access, a random access type, a radio signal quality of a common pilot channel, a collision indicator, a system message failure indicator, and a redirection indicator.

In another embodiment, the random access type includes a random access, or an enhanced random access, or an enhanced random access corresponding to 2 ms transmission time interval TTI length, or an enhanced random access corresponding to 10 ms TTI length.

In another embodiment, the redirection indicator is used for indicating that the random access is initiated when the user terminal is redirected to the first cell.

In another embodiment, the preset threshold includes at least one of a random access success probability threshold, a proportional threshold for number of times of preamble cycles, a proportional threshold for number of times of preamble retransmission, a proportional threshold for a preamble transmission power, and a proportional threshold for negative acknowledgment information, and the processor 1002 is further configured to:

increase random access resources of the first cell, when a ratio of the number of times of random access success in the random access report of the first cell, reported by one or more user terminals to total number of times of random access is less than the random access success probability threshold; and/or increase a maximum number of times of cycles in the random access of the first cell, when a ratio that the number of times of preamble cycles in each random access reaches maximum value in the random access report of the first cell, reported by one or more user terminals reaches the proportional threshold for the number of times of preamble cycles; and/or increase a transmission power of a primary common pilot channel of the first cell, and/or increase uplink interference, and/or increase a constant factor of random access channel demodulation, and/or increase a power ramp step, and/or increase a parameter of a maximum number of times of preamble retransmission, when a reason for preamble transmission failure within each preamble cycle period in the random access report of the first cell, reported by one or more user terminals is that a ratio of reaching the maximum number of times of retransmission is greater than the proportional threshold for the number of times of preamble retransmission; and/or reduce a transmission power of a primary common pilot channel of the first cell, and/or reduce uplink interference, and/or reduce a constant factor of random access channel demodulation, and/or reduce a power ramp step, when the reason for preamble transmission failure within each preamble cycle period in the random access report of the first cell, reported by one or more user terminals is that a ratio that the preamble transmission power reaches a maximum value is greater than the proportional threshold for the preamble transmission power; and/or increase random access resources of the first cell, when the reason for preamble transmission failure within each preamble cycle period in the random access report of the first cell, reported by one or more user terminals is that a ratio of receiving the negative acknowledgment information on the acquisition indicator channel is greater than the proportional threshold for negative acknowledgment information; and/or increase random access resources of the first cell, when the random access delay in the random access report reported by one or more user terminals is greater than the random access delay threshold.

In another embodiment, the network device 60' further includes: a detector 1004, configured to detect whether one or more user terminals support the random access parameter optimization, according to the capability information recording whether one or more user terminals support random access parameter optimization, reported by one or more user terminals; the transmitter 1003 is further configured to forward the access information of the second cell to a network device to which the second cell belongs, if the random access report received by a network device to which the first cell belongs includes access information of a second cell, where the network device to which the first cell belongs is different from the network device to which the second cell belongs.

In another embodiment, the receiver 1001 is further configured to receive capability information recording whether one or more user terminals support random access parameter optimization, reported by one or more user terminals; the transmitter 1003 is further configured to issue indication information for indicating one or more user terminals to record the random access report, if one or more user terminals support the random access parameter optimization; and/or issue request information, for requesting one or more user terminals to report the random access report.

Figure 11:
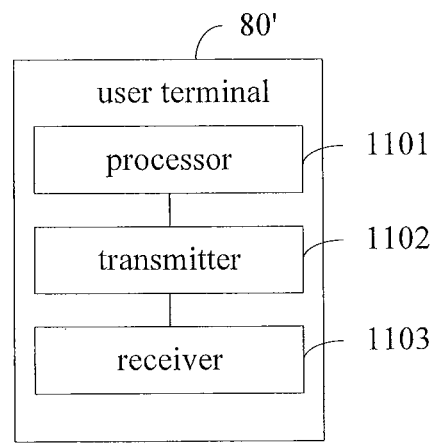
FIG. 11 is a schematic structural diagram of a user terminal according to another embodiment.

As shown in FIG. 11, another embodiment provides a user terminal 80', including: a processor 1101, configured to record a random access report and store the random access parameter adjusted by the network device, where the random access detection item recorded in the random access report includes at least one of number of times of preamble cycles in each random access, a reason for preamble transmission failure within each preamble cycle period and a random access delay; a transmitter 1102, configured to report the random access report to the network device; and a receiver 1103, configured to receive the random access parameter adjusted by the network device.

In another embodiment, the random access detection item recorded in the random access report further includes at least one of an identifier of a random access cell, an identifier of a PLMN to which a random access cell belongs, information of time when a random access occurs, number of times of a random access, a random access type, a radio signal quality of a common pilot channel, a collision indicator, a system message failure indicator, and a redirection indicator.

In another embodiment, the random access type includes a random access, or an enhanced random access, or an enhanced random access corresponding to 2 ms TTI length, or an enhanced random access corresponding to 10 ms TTI length.

In another embodiment, the redirection indicator is used for indicating that the random access is initiated when the user terminal is redirected to the first cell.

In another embodiment, the transmitter 1102 is further configured to report capability information recording whether the user terminal supports random access parameter optimization to the network device; the receiver 1103 is further configured to receive the indication information for indicating to record the random access report, where the indication information is issued by the network device after judging the capability information and acknowledging that the random access parameter optimization is supported; and/or receive request information, for requesting to report the random access report to the network device, issued by the network device.

Persons skilled in the art can understand that, for convenience and brevity of description, the divisions of each functional unit or module are for purposes of illustration only, in practical application, the above functions are assigned to different functional modules as required, that is, the internal structure of the apparatus is divided into different functional modules to accomplish all or a part of the functions described above. Persons skilled in the art can understand that, the detailed working procedures of the systems, apparatuses, and units described above can be deduced effortlessly from the corresponding procedures in the method embodiments, and are not repeated herein.

Understandably, in the embodiments described herein, the disclosed systems, devices and methods may be implemented in other modes. For example, the device embodiments above are illustrative in nature, and the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the application.

Besides, all functional units in the embodiments may be physically stand-alone, or integrated into a processing module, or two or more of the units are integrated into one unit. The integrated unit may be hardware or a software function unit.

When being implemented as a software unit and sold or used as a stand-alone product, the integrated unit may be stored in a computer-readable storage medium. Therefore, the essence of the technical solution of the application, or its contribution to the prior art, or all or part of the technical solution, may be embodied in a software product. The software product may be stored in a computer-readable storage medium and incorporates several instructions for instructing a computer device (for example, personal computer, server, or network device) or a processor to execute all or part of the steps of the method specified in any embodiment. Examples of the storage medium include various media capable of storing program codes, such as a USB flash disk, a mobile hard disk, a read-only memory (ROM), a random access memory (RAM), a magnetic disk, or an optical disk.

Finally, it should be noted that the above embodiments are merely provided for describing the technical solutions of the application, but not intended to limit the scope of the claims. It should be understood by persons skilled in the art that although certain embodiments have been described, modifications can be made to the technical solutions described in the foregoing embodiments, or equivalent replacements can be made to some technical features in the technical solutions. Such modifications or replacements do not cause the essence of corresponding technical solutions to depart from the spirit and scope of the claims.

What is claimed is:

1. A method for processing a random access parameter, comprising:
receiving, by a network device, capability information that indicates whether one or more user terminals support random access parameter optimization, as reported by the one or more user terminals;
detecting, by the network device, according to the capability information, whether the one or more user terminals support the random access parameter optimization;
issuing, by the network device based on one of a periodic and an event-triggered mechanism, indication information that instructs the one or more user terminals to record a random access report if the one or more user terminals support the random access parameter optimization;

receiving, by the network device, the random access report of a first cell reported by the one or more user terminals, wherein a random access detection item recorded in the random access report comprises at least one of: a number of occurrences of a preamble cycle period in each random access, a reason for preamble transmission failure within each preamble cycle period and a random access delay, wherein when one of a number of occurrences of a random access failure (m) divided by a total number of times of access (n), an average access delay, an average number of times of preamble transmission, and number of times of preamble cycle ramp is greater than or equal to the second preset threshold, the random access report of the first cell received by the network device is spontaneously reported by the user terminal;

performing, by the network device, random access detection item statistics according to the random access report and obtaining a statistical value;

if the statistical value reaches a preset threshold, adjusting, by the network device, the random access parameter of the first cell; and issuing, by the network device, the adjusted random access parameter to a user terminal belonging to the first cell.

2. The method according to claim 1, wherein the random access detection item recorded in the random access report further comprises:

at least one of: an identifier of a random access cell, an identifier of a public land mobile network (PLMN) to which the random access cell belongs, information of a time when a random access occurs, a number of occurrences of a random access, a random access type, a radio signal quality of a common pilot channel, a collision indicator, a system message failure indicator, and a redirection indicator.

3. The method according to claim 2, wherein the random access type comprises a random access, or an enhanced random access, or an enhanced random access corresponding to a 2 ms transmission time interval (TTI) length, or an enhanced random access corresponding to a 10 ms TTI length.

4. The method according to claim 2, wherein the redirection indicator indicates that the random access is initiated when the user terminal is redirected to the first cell.

5. The method according to claim 1, wherein the preset threshold comprises at least one of: a random access success probability threshold, a proportional threshold for a number of occurrences of a preamble cycles, a proportional threshold for number of occurrences of a preamble retransmission, a proportional threshold for a preamble transmission power, a proportional threshold for negative acknowledgment information, and a random access delay threshold;

wherein when a ratio of a number of occurrences of a random access success in the random access report reported by the one or more user terminals to a total number of occurrences of random accesses is less than the random access success probability threshold, adjusting of the random access parameter of the first cell further comprises: increasing random access resources of the first cell; and when a ratio that the number of occurrences of preamble cycles in each random access reaches a maximum value in the random access report reported by the one or more user terminals reaches the proportional threshold for the number of occurrences of preamble cycles, adjusting of the random access parameter of the first cell further comprises: increasing a maximum number of times of preamble cycles in the random access of the first cell; and when a reason for a preamble transmission failure within each preamble cycle period in the random access report reported by the one or more user terminals is that a ratio of reaching the maximum number of times of retransmission is greater than the proportional threshold for a number of occurrences of a preamble retransmission, adjusting of the random access parameter of the first cell further comprises: increasing a transmission power of a primary common pilot channel of the first cell, or increasing uplink interference, or increasing a constant factor of random access channel demodulation, or increasing a power ramp step, or increasing a parameter of a maximum number of times of preamble retransmission; and when the reason for preamble transmission failure within each preamble cycle period in the random access report reported by the one or more user terminals is that a ratio that the preamble transmission power reaches a maximum value is greater than the proportional threshold for the preamble transmission power, adjusting of the random access parameter of the first cell further comprises: reducing a transmission power of a primary common pilot channel of the first cell, or reducing uplink interference, or reducing a constant factor of random access channel demodulation, or reducing a power ramp step; and when the reason for preamble transmission failure within each preamble cycle period in the random access report reported by the one or more user terminals is that a ratio of receiving the negative acknowledgment information on the acquisition indicator channel is greater than the proportional threshold for negative acknowledgment information, adjusting of the random access parameter of the first cell further comprises: increasing random access resources of the first cell; and when the random access delay in the random access report reported by the one or more user terminals is greater than the random access delay threshold, adjusting of the random access parameter of the first cell further comprises: increasing random access resources of the first cell.

6. The method according to claim 1, wherein after receiving the random access report of the first cell reported by the one or more user terminals, the method further comprises:

if the random access report received by a network device to which the first cell belongs comprises access information of a second cell, forwarding the access information of the second cell to a network device to which the second cell belongs, wherein the network device to which the first cell belongs is different from the network device to which the second cell belongs.

7. A method for processing a random access parameter, comprising:

reporting, by a user terminal, capability information that indicates whether one or more user terminals support random access parameter optimization to the network device; and receiving, by the user terminal, indication information indicates the user terminal to record a random access report, wherein the indication information is issued by the network device based on one of a periodic and an event-triggered mechanism after determining the capability information and acknowledging that the random access parameter optimization is supported;

recording, by the user terminal, the random access report, wherein a random access detection item recorded in the random access report comprises at least one of: a number of occurrences of a preamble cycle period in each random access, a reason for preamble transmission failure within each preamble cycle period, and a random access delay reporting, by the user terminal, the random access report to the network device, wherein when one of a number of occurrences of a random access failure (m) divided by a total number of times of access (n), an average access delay, an average number of times of preamble transmission, and number of times of preamble cycle ramp is greater than or equal to the second preset threshold, spontaneously reporting, by the user terminal, the random access report; and receiving, by the user terminal, and storing the random access parameter adjusted by the network device.

8. The method according to claim 7, wherein the random access detection item recorded in the random access report further comprises:

at least one of: an identifier of a random access cell, an identifier of a PLMN to which the random access cell belongs, information of a time when a random access occurs, a number of occurrences of a random access, a random access type, a radio signal quality of a common pilot channel, a collision indicator, a system message failure indicator, and a redirection indicator.

9. The method according to claim 8, wherein the random access type comprises a random access, or an enhanced random access, or an enhanced random access corresponding to a 2 ms TTI length, or an enhanced random access corresponding to a 10 ms TTI length.

10. The method according to claim 8, wherein the redirection indicator indicates that the random access is initiated when the user terminal is redirected to the first cell.

11. The method according to claim 7, wherein before reporting the random access report to the network device, the method further comprises:

reporting to the network device that the user terminal records the random access report.

12. The method according to claim 7, wherein before reporting the random access report to the network device, the method further comprises:

receiving request information issued by the network device, wherein the request information is used to request the user terminal to report the random access report to the network device.

13. The method according to claim 7, wherein:

when the random access report records information of a successful random access, the random access report records the identifier of the random access cell;

when the random access report records information of a failed random access, the random access report records at least one of: a number of occurrences of a random access, an identifier of a random access cell, an identifier of a public land mobile network (PLMN) to which the random access cell belongs, information of a time when a random access occurs, a number of occurrences of a preamble cycle period in each random access, a reason for preamble transmission failure within each preamble cycle period, a random access type, a radio signal quality of a common pilot channel and a random access delay.

14. The method according to claim 13, wherein:

when the random access report records random access success information, the random access report further records the PLMN identifier and/or the random access type after recording the identifier of the random access cell.

15. The method according to claim 7, wherein:

when a number of occurrences of a transmission of a preamble or a number of occurrences of a preamble cycle period in the random access reaches a first preset threshold, the random access report records at least one of: a number of occurrences of a random access, an identifier of a random access cell, an identifier of a public land mobile network PLMN to which a random access cell belongs, information of a time when a random access occurs, a number of occurrences of a preamble cycle period in each random access, a reason for preamble transmission failure within each preamble cycle period, a random access type, a radio signal quality of a common pilot channel and a random access delay;

when the number of occurrences of a transmission of the preamble or the number of occurrences of the preamble cycle period in the random access fails to reach the first preset threshold, the random access report records the identifier of the random access cell.

16. The method according to claim 15, when the number of occurrences of a transmission of the preamble or the number of occurrences of the preamble cycles period in the random access fails to reach the first preset threshold, the random access report further records the PLMN identifier or the random access type after recording the identifier of the random access cell.

17. The method according to claim 7, wherein:

when one of a value of a number of occurrences of a random access failure (m) divided by a total number of times of access (n), an average access delay, an average number of times of preamble transmission, and number of times of preamble cycle ramp is greater than or equal to a second preset threshold, storing the random access report.

18. A network device, comprising:

a receiver configured to receive a random access report of a first cell reported by one or more user terminals, wherein a random access detection item recorded in the random access report comprises at least one of: a number of occurrences of a preamble cycle period in each random access, a reason for preamble transmission failure within each preamble cycle period and a random access delay, wherein when one of a number of occurrences of a random access failure (m) divided by a total number of times of access (n), an average access delay, an average number of times of preamble transmission, and number of times of preamble cycle ramp is greater than or equal to the second preset threshold, the random access report of the first cell received by the network device is spontaneously reported by the user terminal;

a processor configured to perform random access detection item statistics according to the random access report and to obtain a statistical value, if the statistical value reaches a preset threshold, the processor is configured to adjust the random access parameter of the first cell; and a transmitter configured to issue the adjusted random access parameter to a user terminal belonging to the first cell;

wherein the receiver is further configured to receive capability information that indicates whether the one or more user terminals support random access parameter optimization, as reported by the one or more user terminals;

the network device further comprises a detector configured to detect, according to the capability information, whether the one or more user terminals support the random access parameter optimization; and the transmitter is further configured to issue, based on one of a periodic and an event-triggered mechanism, indication information that instructs the one or more user terminals to record the random access report if the one or more user terminals support the random access parameter optimization.

19. The network device according to claim 18, wherein the random access detection item recorded in the random access report further comprises:

at least one of: an identifier of a random access cell, an identifier of a PLMN to which the random access cell belongs, information of a time when a random access occurs, a number of occurrences of a random access, a random access type, a radio signal quality of a common pilot channel, a collision indicator, a system message failure indicator, and a redirection indicator.

20. The network device according to claim 19, wherein the random access type comprises a random access, or an enhanced random access, or an enhanced random access corresponding to a 2 ms transmission time interval (TTI) length, or an enhanced random access corresponding to a 10 ms TTI length.

21. The network device according to claim 19, wherein the redirection indicator indicates that the random access is initiated when the user terminal is redirected to the first cell.

22. The network device according to claim 18, wherein the preset threshold comprises at least one of: a random access success probability threshold, a proportional threshold for number of occurrences of a preamble cycle period, a proportional threshold for number of times of preamble retransmission, a proportional threshold for a preamble transmission power, and a proportional threshold for negative acknowledgment information, and the processor is further configured to:

increase random access resources of the first cell when a ratio of the number of occurrences of the random access success in the random access report of the first cell reported by one or more user terminals to total number of occurrences of random accesses is less than the random access success probability threshold; and increase a maximum number of occurrences of cycles in the random access of the first cell when a ratio that the number of occurrences of preamble cycles in each random access reaches maximum value in the random access report of the first cell, as reported by one or more user terminals, reaches the proportional threshold for the number of occurrences of preamble cycles; and increase a transmission power of a primary common pilot channel of the first cell, or increase uplink interference, or increase a constant factor of random access channel demodulation, or increase a power ramp step, or increase a parameter of a maximum number of occurrences of preamble retransmissions, wherein a reason for preamble transmission failure within each preamble cycle period in the random access report of the first cell, as reported by one or more user terminals, is that a ratio of occurrences of reaching the maximum number of occurrences of retransmission is greater than the proportional threshold for the number of times of preamble retransmission; and reduce a transmission power of a primary common pilot channel of the first cell, or reduce uplink interference, or reduce a constant factor of random access channel demodulation, or reduce a power ramp step, when the reason for preamble transmission failure within each preamble cycle period in the random access report of the first cell, as reported by one or more user terminals is that a ratio that the preamble transmission power reaches a maximum value is greater than the proportional threshold for the preamble transmission power; and increase random access resources of the first cell when the reason for preamble transmission failure within each preamble cycle period in the random access report of the first cell, as reported by one or more user terminals, is that a ratio of receiving the negative acknowledgment information on the acquisition indicator channel is greater than the proportional threshold for negative acknowledgment information; and increase random access resources of the first cell when the random access delay in the random access report reported by one or more user terminals is greater than the random access delay threshold.

23. The network device according to claim 18, wherein the transmitter is further configured to forward the access information of the second cell to a network device to which the second cell belongs if the random access report received by a network device to which the first cell belongs comprises access information of a second cell, wherein the network device to which the first cell belongs is different from the network device to which the second cell belongs.

24. The network device according to claim 18, wherein the transmitter is further configured to issue request information for requesting one or more user terminals to report the random access report.

25. A user terminal, comprising:

a processor configured to record a random access report and store the random access parameter adjusted by the network device, wherein a random access detection item recorded in the random access report comprises at least one of: a number of occurrences of a preamble cycle period in each random access, a reason for preamble transmission failure within each preamble cycle period and a random access delay;

a transmitter configured to report the random access report to the network device, wherein when one of a number of occurrences of a random access failure (m) divided by a total number of times of access (n), an average access delay, an average number of times of preamble transmission, and number of times of preamble cycle ramp is greater than or equal to the second preset threshold, the transmitter is further configured to spontaneously report the random access report; and a receiver configured to receive the random access parameter adjusted by the network device;

wherein the transmitter is further configured to report capability information that indicates whether the user terminal supports random access parameter optimization to the network device;

the receiver is further configured to receive indication information for instructing the user terminal to record the random access report, wherein the indication information is issued by the network device based on one of a periodic and an event-triggered mechanism after determining the capability information and acknowledging that the random access parameter optimization is supported.

26. The user terminal according to claim 25, wherein the random access detection item recorded in the random access report further comprises:

at least one of: an identifier of a random access cell, an identifier of a PLMN to which the random access cell belongs, information of a time when a random access occurs, a number of occurrences of a random access, a random access type, a radio signal quality of a common pilot channel, a collision indicator, a system message failure indicator, and a redirection indicator.

27. The user terminal according to claim 26, wherein the random access type comprises a random access, or an enhanced random access, or an enhanced random access corresponding to a 2 ms TTI length, or an enhanced random access corresponding to a 10 ms TTI length.

28. The user terminal according to claim 26, wherein the redirection indicator indicates whether the random access is initiated when the user terminal is redirected to the first cell.

29. The user terminal according to claim 25, wherein
the receiver is further configured to receive request information for requesting to report the random access report to the network device, issued by the network device.

30. The method according to claim 7, wherein: when one of a value of m divided by n, an average access delay, an average number of times of preamble transmission, and number of times of preamble cycle ramp is less than a second preset threshold, deleting the random access report.

* * * * *